US012167738B2

United States Patent
Roche et al.

(10) Patent No.: US 12,167,738 B2
(45) Date of Patent: Dec. 17, 2024

(54) INDIVIDUALIZED ANIMAL DRY FOOD COMPOSITION AND KIT

(71) Applicant: MARS, INCORPORATED, McLean, VA (US)

(72) Inventors: Jean-Baptiste Roche, Aimargues (FR); Claude Ecochard, Aimargues (FR); Sally Perea, Lewisburg, OH (US)

(73) Assignee: MARS, INCORPORATED, McLean, VA (US)

( * ) Notice: Subject to any disclaimer, the term of this patent is extended or adjusted under 35 U.S.C. 154(b) by 383 days.

(21) Appl. No.: 17/628,823

(22) PCT Filed: Sep. 23, 2020

(86) PCT No.: PCT/US2020/052172
§ 371 (c)(1),
(2) Date: Jan. 20, 2022

(87) PCT Pub. No.: WO2021/061743
PCT Pub. Date: Apr. 1, 2021

(65) Prior Publication Data
US 2022/0256891 A1    Aug. 18, 2022

(30) Foreign Application Priority Data
Sep. 23, 2019 (EP) ..................................... 19198990

(51) Int. Cl.
*A23K 50/42* (2016.01)
*A23K 20/147* (2016.01)
*A23K 20/158* (2016.01)
*A23K 20/20* (2016.01)
*A23K 20/24* (2016.01)

(52) U.S. Cl.
CPC ............ *A23K 50/42* (2016.05); *A23K 20/147* (2016.05); *A23K 20/158* (2016.05); *A23K 20/24* (2016.05); *A23K 20/30* (2016.05)

(58) Field of Classification Search
CPC ........ A23K 50/42; A23K 20/24; A23K 20/30; A23K 20/147; A23K 20/158
See application file for complete search history.

(56) References Cited

U.S. PATENT DOCUMENTS

| | | |
|---|---|---|
| 6,358,546 B1 | 3/2002 | Bebiak et al. |
| 6,493,641 B1 | 12/2002 | Singh et al. |
| 6,669,975 B1 | 12/2003 | Abene et al. |
| 6,733,771 B1 | 5/2004 | Minard et al. |
| 2003/0004655 A1 | 1/2003 | Singh et al. |
| 2004/0253342 A1* | 12/2004 | Townsend .............. A23K 40/25 426/2 |
| 2005/0181097 A1* | 8/2005 | Townsend .............. A23K 50/40 426/89 |
| 2007/0020355 A1 | 1/2007 | Schlebusch et al. |
| 2007/0118295 A1 | 5/2007 | Al-Murrani |
| 2009/0311366 A1 | 12/2009 | Biourge et al. |
| 2014/0141134 A1 | 5/2014 | Johnson et al. |
| 2014/0272028 A1 | 9/2014 | Donavon et al. |
| 2015/0072048 A1 | 3/2015 | Potthoff et al. |

FOREIGN PATENT DOCUMENTS

| | | |
|---|---|---|
| CA | 2 450 055 C | 8/2010 |
| CN | 105209903 A | 12/2015 |
| EP | 1 093 719 A2 | 4/2001 |
| KR | 101 671 888 B1 | 11/2016 |
| WO | WO 01/69487 A1 | 9/2001 |
| WO | WO 2014/078856 A1 | 5/2014 |

OTHER PUBLICATIONS

International Search Report mailed Jan. 19, 2021 in International Application No. PCT/US2020/052172.
National Research Council, 1985, Nutritional Requirements for dogs, National Academy Press, Washington DC or Association of America Feed Control Officials, Official Publication 1996.
Tan Shiwen and Huang Guiping, "Research progress of computer application in animal husbandry and veterinary medicine," Guizhou Animal Husbandry and Veterinary Medicine, 25(5):1-10 (2001).

* cited by examiner

*Primary Examiner* — Anthony J Weier
(74) *Attorney, Agent, or Firm* — Baker Botts L.L.P.

(57) ABSTRACT

The present invention relates to a method for providing an individualized nutritionally complete diet for an animal, in particular an animal with one or more pathological condition(s). The present invention also relates to a device for providing an individualized nutritionally complete diet for an animal, having means adapted to execute the steps of the method. The present invention also relates to a computer program to cause the device to execute the steps of the method. A computer-readable medium having stored thereon the computer program is further provided. Kits and compositions are further provided.

15 Claims, No Drawings

INDIVIDUALIZED ANIMAL DRY FOOD COMPOSITION AND KIT

CROSS-REFERENCE TO RELATED APPLICATIONS

This application is a U.S. National Stage Patent Application under 35 U.S.C. § 371 of International Patent Application No. PCT/US2020/052172, filed on Sep. 23, 2020, which claims priority to EP Patent Application No. 19198990.4, filed on Sep. 23, 2019, the contents of each of which are is hereby incorporated by reference in their entireties, and to each of which priority is claimed.

FIELD OF THE INVENTION

The present disclosure relates to the field of functional dry food for animals, and especially for companion animals such as cats and dogs.

BACKGROUND OF THE INVENTION

There is an increasing awareness of the importance of a proper diet for the health maintenance and disease prevention or treatment of animals, especially of companion animals. Customized diets for various life stages and conditions are available for animals, especially for companion animals. Although a high number of suppliers and products are available to pet care product consumers, it may take significant time, effort and investigation for a customer to determine which product(s) best suits a particular animal's need among the large number of alternatives. While veterinarians and other professionals may assist in recommending a given brand of pet food for a particular pet, pet foods are typically mass manufactured to meet the needs of an average pet within a range of selected pets that is essentially based on the pet's age and/or size are the most often taken into consideration.

In particular, there is a need for individualized dry food products for animals (i.e. dry kibbles), which are particularly convenient for storage and feeding, and which are less prone to spoilage.

Nutritional needs, however, vary from pet to pet, and a customized regimen of appropriate nutrients for a particular pet or breed of pet would be beneficial. But in the light of the practical difficulties and expenses of tailoring a custom diet for a particular pet, consumers are often forced to choose among a limited variety of available mass-produced pet foods and products. With the view of fulfilling the pet owners' need for adapted food compositions, several manufacturers have conceived systems allowing delivering foodstuff that better correlates with the specific nutritional requirements of their companion animal.

U.S. Pat. No. 6,358,546 is directed toward methods for customizing pet food, wherein a user input is used to form an individual pet profile, which is used to generate a customized pet food formula.

WO 01/69487 discloses the principle of methods and apparatus for customizing pet food that utilize an integrated internet-based customer interface and workflow process management. Completely custom-made food category provides a practically unlimited choice of customized pet food formulation in which pet food is manufactured from raw ingredients in a respective individual pet profile. A more limited range of customized formulations may be manufactured from pre-mixed components selected by a purchaser in a respective individual pet profile.

U.S. Pat. No. 6,669,975 is directed to a customized dietary health management system for pets. This management system includes manufacturing a dry kibble product by blending pre-made dry kibbles, adding additional functional ingredients and then packaging. A customized food product is obtained by selecting at least one formulation of pre-made dry kibble, separating a predetermined volume of the at least one formulation of the pre-made dry kibble, blending the predetermined volume of pre-made dry kibble, coating the volume of dry kibble with a selected mixture of functional ingredients and then packaging the resulting product.

U.S. Pat. No. 6,493,641 pertains to methods for manufacturing pet foods customized to the health and nutrition requirements of an individual pet. Those methods include obtaining an individual pet profile for the pet, obtaining an analysis from a biological sample of the pet, processing the individual pet profile and the biological sample analysis to create a first pet food formula specific to the user input individual pet profile and the biological sample analysis, and manufacturing the pet food according to the first pet food formula. In some embodiments, the method includes suggesting a pre-manufactured kibble that correlates with the processed pet profile, suggesting a pre-manufactured additive that correlates with the processed pet profile, and providing a set of feeding instructions for the pet.

US 2007/0118295 discloses a concept of methods and systems for designing animal food compositions in which an important component is the processing of information relating to the functional genomic profile of animals.

US 2014/0272028 which relates to systems and methods for collecting specific pet information and utilizing that information to create a custom pet food product. According the disclosed methods, based upon a correlation by a computer, the computer suggests a pre-manufactured kibble or blend from a number of possible pre-manufactured kibbles or blends and creates a pet food additive based on the pet food product formulation specific to the pet and in accordance with the pet profile of the pet.

U.S. Pat. No. 6,733,771 and EP1093719 both relate to methods and apparatus for the administration of food to horses, said methods being defined by a specific packaging.

US2015/0072048, although relating to a computer-implemented method of providing a personalized diet, does not teach nor mention the use of pre-made compositions, and more particularly of pre-made composition which are not nutritionally complete.

WO 2014/078856 discloses systems and methods for creating a customized blend of pet food. Those methods include a step of creating a first environment profile for the pet consisting of inputting pet characteristics in a computer system, such as age, breed, weight and food preferences. The method also include acquiring data, which data can include published pet nutrition information, comparing the data to the first environmental profile, and then generating the nutritional target from the said data and the first environmental profile, and then a nutritional blend recipe is generated on a blend customization computer system. Once a nutritional blend recipe has been generated, a nutritional blend is prepared based on a plurality of pre-blend formulae contained in a pre-blend database contained in a database server, through a customized blending system. Pre-blends can be configured from any suitable ingredients of kibble products and can be created at a blending center. The customized blend recipe may call for a first percentage of a first pre-blend, a second percentage of a second pre-blend and a third percentage of a third pre-blend to create a customized blend of kibble that can match a nutrition target for the pet.

Still, the preparation of dry food compositions which are suitable for animal consumption remains difficult. Hence, there remains a need for improved systems and methods for manufacturing individualized pet food compositions, e.g., dry pet food compositions. There remains a need for such systems and methods which would remain cost-effective. There also remains a need for such systems and methods, for preparing dry compositions suitable for animals with pathological condition(s).

SUMMARY OF THE INVENTION

In some aspects, the present disclosure relates to a method for providing an individualized nutritionally complete diet for an animal, in particular an animal with one or more pathological condition(s), the method including the steps of:

a) providing an individual physiological profile of an animal, and optionally an individual pathological profile of the animal, from one or more values indicative of a physiological status, and optionally a medical status, of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal, whereby an individualized nutritionally complete diet is provided; wherein none of the said selected distinct pre-made dry compositions consists of a nutritionally complete diet alone.

In other aspects, the present disclosure relates to means and devices for providing or implementing an individualized nutritionally complete diet for an animal, having means adapted to execute the steps of the method described above. Hence, in some aspects, the present disclosure also relates to a computer program including instructions to cause the device according to the preceding claim to execute the steps of the method described herein.

The disclosure also relates to a computer-readable medium having stored thereon the computer program described above.

In still yet other aspects, the present disclosure also provides a kit for preparing a nutritionally complete diet, comprising at least 2 or more dry compositions from a list.

DETAILED DESCRIPTION OF THE INVENTION

None of systems or methods described in the art specifically discloses pre-made dry compositions/components, such as pre-made dry core components, of which none alone would constitute a nutritionally complete composition. Also, none of those pre-made dry compositions/components would be selected from a plurality of distinct pre-made dry compositions/components, such as a set of 5 or more distinct pre-made dry compositions/components.

Surprisingly, the inventors have found that the preparation of individualized nutritionally complete diet for an animal from a selection of pre-made dry compositions (such as pre-made dry core components, and in particular kibbles) of which none would be itself a nutritionally complete composition, could provide several advantages:

a first advantage is that the method allows to personalize a plurality of animal food compositions with only a minimal amount of pre-manufactured compositions, hence providing a more economical alternative to other methods;

a second advantage is that it is particularly well adapted for the preparation of dry diets or compositions, such as kibbles;

a third advantage is that it is also well adapted to animals with one or several diagnosed or suspected pathological condition(s), such as pets having a natural susceptibility to certain types of disorders (i.e. pets belonging to a specific breed, or which have an antecedent for a specific set of disorders). More particularly, it is well adapted to animals with several diagnosed or suspected pathological conditions.

The disclosed methods are also suitable for the preparation of individualized nutritionally complete diet for an animal without any pathological condition.

The disclosure manages to solve the problem of being able to offer an individualized nutritionally complete diet to a companion animal suffering from several diagnosed or suspected pathologies, said solution being easily reduced to practice at an industrial scale. The solution is based on the completely new approach including manufacturing pre-made dry not nutritionally complete composition designed in a perspective of offering the perfect nutrients composition only when mixed. In some aspects, the method herein described is not based on i) mixing already existing nutritionally complete composition with, as a consequence, a limitation of the nutrient mix possibility due to the level of each nutrient necessary to have these composition nutritionally complete, nor ii) mixing on a case by case in an "artisanal" way each nutrient with, as a consequence, a limitation in the industrial scale and an excessive price.

According to a first main embodiment, the disclosure relates to a method for providing an individualized nutritionally complete diet for an animal, in particular an animal with one or more pathological condition(s), the method including the steps of:

a) providing an individual physiological profile of an animal, and optionally an individual pathological profile of the animal, from one or more values indicative of a physiological status, and optionally of a medical status, of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal of, whereby an individualized nutritionally complete diet is provided; wherein none of the said selected distinct pre-made dry compositions consists of a nutritionally complete diet alone, said nutritionally complete diet being defined as including at least one source of proteins, at least one source of vitamins, at least one source of fats and at least one source of minerals. The present disclosure may also relate to a device/apparatus for performing the methods for preparing the individualized nutritionally complete dry food diet described herein. This apparatus may be specially constructed for the required purposes, or it may comprise a general purpose computer selectively activated or reconfigured by a computer program stored in the computer. The method described herein may thus consist of, or rely partly on, a computer-implemented method.

Hence, according to another main embodiment, the disclosure also relates to a device for providing an individualized nutritionally complete diet for an animal, having means adapted to execute the steps of the method described above.

Hence, according to another main embodiment, the disclosure relates to a computer program comprising instructions to cause the device according to the preceding claim to execute the steps of the method described herein.

Hence, according to another main embodiment, the disclosure relates to a computer-readable medium having stored thereon the computer program described above.

Hence, according to another main embodiment, the disclosure relates to an individualized nutritionally complete diet which is obtained by the method described herein.

Hence, according to another main embodiment, the disclosure also provides a kit for preparing a nutritionally complete diet, comprising at least 2 or more distinct dry compositions selected from the group consisting of:

composition A with at least 1.5% of Sodium, at least 38% of protein and no more than 10% of fat, relative to the total weight of the composition on a dry-matter basis;

composition B with at least 0.5% of *Psyllium* Tegument, at least 35% of protein, at least 0.5% of calcium and no more than 0.7% of Phosphorus, relative to the total weight of the composition on a dry-matter basis;

composition C with at least 37% of protein, at least 1.5% of Sodium, at least 2.5% of chloride and at least 0.6% of EPA and/or DHA, relative to the total weight of the composition on a dry-matter basis;

composition D with at least 20% of TDF, at least 38% of protein, no more than 9% of fat and at least 1.3% of Potassium, relative to the total weight of the composition on a dry-matter basis;

composition E with at least 3.5% of linoleic acid, at least 0.4% of Phosphorus and no more than 7% of TDF, relative to the total weight of the composition on a dry-matter basis;

composition F with at least 0.55% of EPA and/or DHA, relative to the total weight of the composition on a dry-matter basis;

composition G with at least 0.8% of EPA/DHA and at least 1.5% of Sodium, relative to the total weight of the composition on a dry-matter basis;

composition H with at least 20% of fat, no more than 0.5% of Calcium and at least 5% of linoleic acid, relative to the total weight of the composition on a dry-matter basis;

composition I with at least 4% of *Psyllium* Tegument, relative to the total weight of the composition on a dry-matter basis;

composition J with no more than 6 ppm of total copper, relative to the total weight of the composition on a dry-matter basis.

composition A' with at least 1.7% of Sodium and no more than 10% of fat, relative to the total weight of the composition on a dry-matter basis;

composition B' with at least 40% of protein and at least 1.5% of calcium, relative to the total weight of the composition on a dry-matter basis;

composition C' with no more than 6% of fat and no more than 0.45% of Calcium, no more than 0.45% of Phosphorus, relative to the total weight of the composition on a dry-matter basis;

composition D' with at least 22% of fat, at least 0.55% of EPA and/or DHA and at least 5% of linoleic acid, relative to the total weight of the composition on a dry-matter basis;

composition E' with no more than 7% of fat, at least 25% of TDF and at least 35% of protein, relative to the total weight of the composition on a dry-matter basis;

composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

composition G' with no more than 0.35% of Calcium, no more of 0.35% of phosphorus, at least 1.6% of Sodium and at least 25% of TDF, relative to the total weight of the composition on a dry-matter basis;

composition H' with no more than 6% of fat and at least 1.6% of sodium, relative to the total weight of the composition on a dry-matter basis;

composition I' with no more than 0.21% of Sodium and at least 1.65% of total arginine, relative to the total weight of the composition on a dry-matter basis;

composition J' with no more than 6 ppm of total copper and no more than 20% of fat, relative to the total weight of the composition on a dry-matter basis;

composition K' with at least 40% of protein and no more than 23% of starch, relative to the total weight of the composition on a dry-matter basis;

composition L' with at least 21% of total dietary fiber, relative to the total weight of the composition on a dry-matter basis.

It is made clear that the lower and upper amounts of each ingredient, when not explicitly reported, are necessarily rendered dependent upon the total dry-matter weight of each composition, and the presence of the other recited compounds. However, each final range is readily determinable by the skilled in the Art. The invention will be described in more details, hereafter.

General Definitions

As used herein, the words "a" or "an," when used in conjunction with the term "comprising" in the claims and/or the specification, can mean "one," but they are also consistent with the meaning of "one or more," "at least one," and/or "one or more than one". The terms "having," "including," "containing" and "comprising" are interchangeable, and one of skill in the art will recognize that these terms are open ended terms.

As used herein, the term "about" or "approximately" means within an acceptable error range for the particular value as determined by one of ordinary skill in the art, which will depend in part on how the value is measured or determined, i.e., the limitations of the measurement system.

As used herein, a "pre-made composition" refers to a composition which is suitable for food consumption by an animal, but which is not nutritionally complete, and which upon mixing or contact with one or more pre-made compositions, according to a nutrient formula specific to the said animal, may provide an individualized nutritionally complete, or non-nutritionally complete, food composition. Such pre-made compositions are characterized by the presence of more than one type of compound. In that sense, a pure isolated compound is not itself pre-made.

As used herein, "a set of 2 or more distinct pre-made composition", may include 2, 3, 4, 5, 6, 7, 8, 9, 10, 11, 12, 13, 14, 15, 16, 17, 18, 19, 20 or more than 20 distinct pre-made compositions.

As used herein, the terms "food", "diet" or "foodstuf" designate a material containing protein, carbohydrate and/or fat, which is used in the body of an organism to sustain growth, repair and vital processes and to furnish energy. Foods may also contain supplementary substances or additives, for example, minerals, vitamins and condiments (See Merriam-Webster's Collegiate Dictionary, 10th Edition, 1993).

As used herein, the terms "dry diet", "dry food" or "dry composition", usually relate to a diet, food or a composition with 20% or less than 20% of moisture content, relative to the total weight of the composition/food, preferably of 14% or less than 14% of moisture content, relative to the total weight of the composition. In general, such dry diet, dry food or dry composition may even contain much less than 14% of moisture content, relative to the total weight of the composition, such as from 1 to 14% of moisture content. Although this definition is not limited to one specific form of presentation, a dry diet, dry food or dry composition is generally presented in the form of (biscuit-like) kibbles, and/or dry core components. For instance, dry compositions may be manufactured by mixing ingredients and kneading in order to make consistent dough that can be cooked. The process of creating a dry pet food is usually done by baking and/or extruding. The dough is typically fed into a machine called an expander and/or extruder, which uses pressurized steam or hot water to cook the ingredients. While inside the extruder, the dough is under extreme pressure and high temperatures. The dough is then pushed through a die (specifically sized and shaped hole) and then cut off using a knife. The puffed dough pieces are made into a dry product, such as a kibble, by passing it through a dryer so that moisture is dropped down to a defined target ensuring stability of the food until consumption. The product/kibble can then be sprayed with fats, oils, minerals, vitamins, natural extracts cocktail, flavors and optionally sealed into packages.

As used herein, the term "kibble" includes a particulate pellet like component of animal feeds, such as dog and cat feeds, typically having a moisture, or water, content of less than 20% by weight, relative to the total weight of the kibble. Kibbles may range in texture from hard to soft. Kibbles may range in internal structure from expanded to dense. Kibbles may be formed by an extrusion process. For instance, a kibble can be formed from a core and a coating to form a kibble that is coated, also called a coated kibble. It should be understood that when the term "kibble" is used, it can refer to an uncoated kibble or a coated kibble.

As used herein, the term "coating" means a partial or complete covering, typically on a core, that covers at least a portion of a surface, for example a surface of a core. In one example, a core may be partially covered with a coating such that only part of the core is covered, and part of the core is not covered and is thus exposed. In another example, the core may be completely covered with a coating such that the entire core is covered and thus not exposed.

Therefore, a coating may cover from a negligible amount up to the entire surface. A coating can also be coated onto other coatings such that a layering of coatings can be present.

As used herein, the term "core component", such as in "dry core component", or "dry coated kibble" refers to an animal food product with a core and a shell at least partially covering said core. Hence the "core component" refers to the part of such an animal food product. Examples of such core components are described in US20070020355, the entirety of which is hereby incorporated herein by reference. Such dry core-components are particularly suitable as dry compositions, in the context of the invention.

As used herein, the term "core", or "core matrix", means the particulate pellet of a kibble and is typically formed from a core matrix of ingredients and has a moisture, or water, content of less than 12% by weight. The particulate pellet may be coated to form a coating on a core, which may be a coated kibble. The core may be without a coating or may be with a partial coating. In an embodiment without a coating, the particulate pellet may comprise the entire kibble. Cores can comprise farinaceous material, proteinaceous material, and mixtures and combinations thereof, such as those selected from a protein source, a carbohydrate source, and a fat source.

As used herein, the term "nutritionally complete" designates a composition, diet or foodstuff that provides the complete and balanced nutritional requirements to the target animal (i.e. the companion animal or pet). For instance, such a nutritionally complete diet or composition can be a complete dog or a complete cat food. A nutritionally complete dry diet or composition is such, that it is a nutritionally adequate feed with which the said pet animal, e.g. the said dog, can be fed as a daily ration, (i.e. which is capable of sustaining life without additional food, except water. Illustratively, a nutritionally complete food diet or composition may include, in a non-exclusive manner, cereals and vegetable protein extracts, fibers, oils and fats, proteins, chicory pulps, yeasts and parts thereof, minerals, Vitamins, preservatives, antioxidants, water, amino-acids, sodium. In a general manner, nutritionally complete compositions comprise at least one source of proteins (or polypeptides or amino-acids), such as protein extracts, at least one source of vitamins, at least one source of fats (or fatty acids) and at least one source of minerals.

Preferably, nutritionally complete diet or composition comprise at least one source of proteins (or polypeptides), such as protein extracts, at least one source of vitamins and at least one source of fats and at least one source of minerals, in minimal recommended amounts, such as those defined in Table 1A or 1B.

Examples of complete and balanced food are known in the Art, such as those described in National Research Council, 1985, Nutritional Requirements for Dogs, National Academy Press, Washington D.C., or Association of American Feed Control Officials, Official Publication 1996, the disclosure of each of which is incorporated by reference herein.

Such complete diet or pet food can be defined according to the European Union (EU) Regulation n° 767/2009, on the placing on the market and use of feed (art. 3(i)) adapted to pet food. If a manufacturer labels a product as a complete pet food without specification of a determined life stage, it is assumed to be complete for all life stages and should be formulated according to the levels recommended (i.e. for early growth and reproduction). If the product is designed for a specific life stage, then the label must clearly state this.

In some aspects, a nutritionally complete diet or composition includes a diet or a composition including at least one source of proteins, at least one source of vitamins, at least one source of fats and at least one source of minerals.

As used herein, a "daily ration" represents the average total quantity of feeding stuffs, calculated on a moisture content of 12%, required daily by an animal of a given species, age category and yield, to satisfy all its needs. The above-mentioned legal definition means that the average total quantity of a specific pet food that is needed daily by a pet of a given species, age category and life style or activity to satisfy all its energy and nutrient requirements; also by reference to EU regulation no 767/2009 and use of feed (art. 2(c).

As used herein, a "complementary pet food", also by reference to EU regulation no 767/2009 and use of feed (art.

30)) adapted to pet food, is a pet food which has a high content of certain substances but which, by reason of its composition, is sufficient for a daily ration only if used in combination with other pet foods.

As used herein, an "Allowance" or "Recommendation" for daily intake (RDI)" is the level of intake of a nutrient or food component that appears to be adequate to meet the known nutritional needs of practically all healthy individuals. It reflects the minimum requirement plus a safety margin for differences in availability between individual animals and for nutrient interactions. In practice this would be translated as the levels of essential nutrients that healthy individuals should consume over time to ensure adequate and safe nutrition.

As used herein, a "nutrient requirement" is the quantity of a nutrient that must be supplied to an animal in order to satisfy its metabolic needs. It reflects the minimum average level of intake of a nutrient, which, over time, is sufficient to maintain the desired biochemical physiological functions in a population.

As used herein, a "nutritional maximum limit" is the maximum level of a nutrient in a complete pet food that, based on scientific data, has not been associated with adverse effects in healthy pets, in particular healthy dogs and cats; according to the European Pet Food Industry Federation Guidelines. In addition, maximum permitted levels have been determined by the legislator for several nutrients if added as a nutritional additive (i.e. trace elements & vitamin D) (legal maximum). They are laid down in the Community Register of Feed Additives pursuant to Regulation 1831/2002/EC of the Parliament and the Council, concerning additives in feeding stuffs. The legal maximum levels apply to all life stages (EU Regulation 1831/2003 in conjunction with EU register of feed additives).

As used herein, the term "fat" encompasses any food-acceptable fat(s) and/or oil (s) irrespective of their consistency at room temperature, i.e. irrespective of whether said "fat" is present in essentially fluid form or in essentially solid form. The composition according to the disclosure may comprise fat of animal and/or vegetable origin. Fat can be supplied by any of a variety of sources known by those skilled in the art. Plant fat sources include, without limitation, wheat, sunflower, safflower, rapeseed, olive, borage, flaxseed, peanuts, blackcurrant seed, cottonseed, wheat, corn germ, algae oil as well as oils derived from these and other plant fat sources. Animal sources include, for example and without limitation, chicken fat, turkey fat, beef fat, duck fat, pork fat, lamb fat, etc., fish oil, krill oil or any meat, meat by-products, seafood, dairy, eggs, etc. Fat content of foods may be determined by any number of methods known by those of skill in the art. A fat source may comprise, or even consist essentially of a mixture of fatty acids.

As used herein, the term "EPA and/or DHA" designates a fatty acid or a mixture of fatty acids consisting of (i) only eicosapentaenoic acid or its derivatives, such as its ester derivatives, such as eicosapentaenoic acid ethyl ester, and salts thereof (EPA), (ii) only docosahexaenoic acid or its derivatives, such as its ester derivatives, such as docosahexaenoic acid ethyl ester, and salts thereof (DHA) or (iii) a combination of eicosapentaenoic acid and docosahexaenoic acid, or their respective derivatives, such as eicosapentaenoic acid ethyl ester and docosahexaenoic acid ethyl ester, and salts thereof (EPA+DHA). Thus, an amount of "EPA and/or DHA" means (i) an amount of EPA, in the absence of DHA, (ii) an amount of DHA, in the absence of EPA, or (iii) an amount of a combination of EPA and DHA.

As used herein, the term "carbohydrates" designates a mixture of polysaccharides and sugars that are metabolized for energy when hydrolyzed in the body. The carbohydrate content of foods may be determined by any number of methods known by those of skilled in the art.

Carbohydrates may be supplied under the form of any of a variety of carbohydrate sources known by those skilled in the art, including without limitation starch (any kinds, corn, wheat, barley . . . ) beet pulp (which contain a bit of sugars) and *psyllium*.

As used herein, the term "fiber", or "dietary fiber", or "total dietary fiber", or "TDF" (for "Total Dietary Fibers"), designates soluble fibers and insoluble fibers. Soluble fibers can be defined as being resistant to digestion and absorption in the small intestine and undergo complete or partial fermentation in the large intestine by opposition to insoluble fiber that can be defined as non-starch polysaccharides that are resistant to digestion and absorption in the small intestine, and resistant to fermentation in the large intestine. Soluble fibers are considered as having a prebiotic effect by providing short chain fatty acids as a source of energy to colonocytes. Insoluble fibers are considered as useful for transit and ballast effect. As non-limitative example of fibers, it can be mentioned a first group comprising beet pulp, guar gum, chicory root, *psyllium*, pectin, blueberry, cranberry, squash, apples, oats, beans, citrus, barley, or peas, and a second group comprising cellulose, whole wheat products, wheat oat, corn bran, flax seed, grapes, celery, green beans, cauliflower, potato skins, fruit skins, vegetable skins, peanut hulls, and soy fiber. A preferred fiber is chicory pulp or cellulose As used herein, the term "*Psyllium*" refers to a small seed produced by plants of the genus *Plantago*, principally *Plantago ovata* and *Plantago afra*; and extracts thereof. *Psyllium* seeds are very rich in soluble and insoluble fibers (65% cellulose, hemicellulose and lignin, on the one hand, and 35% of gums, pectins and mucilage on the other). These fibers are found mainly in the tegument or seed "husk".

As used herein, the term "starch" refers to a polysaccharide that is composed of amylose and amylopectin. Starch occurs in many plant tissues as granules, usually between 1 and 100 µm in diameter, depending upon the plant source. Chemically, starches are polysaccharides composed of α-D-glucopyranosyl units linked together with α-D(1-4) and/or α-D(1-6) linkages and are comprised of two molecular types: amylose, the straight chain polyglucan comprised of approximately 1000 α-D(1-4) linked glucoses; and amylopectin, the branched glucan, comprised of approximately 4000 glucose unite with branches occurring as α-D(1-6) linkages. Starch encompasses the various crystalline structures of A-type, B-type and C-type starches, which contain different proportions of amylopectin. A-type starches are found mainly in cereals, while B-type starches are found mainly in tubers and amylose-rich starches. C-type starch consists of a mixture of both A and B forms and is found mainly in legumes.

As used herein, the term "adult" means an animal has passed puberty and reaches its biological maturation point.

As used herein, a "pet animal" or "companion animal" generally includes, or even consists of, a pet mammal. Pet mammals encompass dogs, cats, rabbits, hamsters, guinea pigs, rats and mice. Preferred pet animals herein are feline or canine, especially as dogs and cats.

As used herein, the term "feline" encompasses animals, including pet animals, selected in the group comprising cheetah, puma, jaguar, leopard, lion, lynx, liger, tiger, panther, bobcat, ocelot, smilodon, caracal, serval and cats. As used herein, cats encompass wild cats and domestic cats, and most preferably domestic cats.

As used herein, the term "canine" encompasses animals, including pet animals selected in the group comprising recognized dog breeds (some of which are further subdivided), which may include afghan hound, airedale, akita, Alaskan malamute, basset hound, beagle, Belgian shepherd, bloodhound, border collie, border terrier, borzoi, boxer, bulldog, bull terrier, cairn terrier, chihuahua, chow, cocker spaniel, collie, corgi, dachshund, dalmatian, Doberman, English setter, fox terrier, German shepherd, golden retriever, great Dane, greyhound, griffon bruxellois, Irish setter, Irish wolfhound, King Charles spaniel, Labrador retriever, Lhasa Apso, mastiff, newfoundland, old English sheepdog, Papillion, Pekingese, pointer, Pomeranian, poodle, pug, rottweiler, St. Bernard, saluki, Samoyed, schnauzer, Scottish terrier, Shetland sheepdog, shih tzu, Siberian husky, Skye terrier, springer spaniel, West Highland terrier, whippet, Yorkshire terrier, etc.

As used herein, a "subpopulation" herein is a set of one to many animals of one species, but less than an entire species, definable in terms of genotype and/or one or more attributes of physiological condition that, in a subpopulation of more than one member, are common to members of the subpopulation. In certain embodiments, the subpopulation is defined at least in part by specific breed. For example, in the case of animals of mixed breed, a subpopulation can be defined at least in part by breed heritage, which can be established through knowledge of the parental breeds, phenotypic characteristics, genotypic assessment, or by genetic markers such as SNPs. In certain embodiments, the subpopulation is defined at least in part by physiological condition.

As used herein, the term "physiological profile" refers to any one or combination of attributes of an animal including its specie, breed, sex, neuter status, size, weight, ideal body weight, Body Condition Score, age, activity level, disposition, state of wellness, and medical history.

As used herein, the term "pathological profile" refers to any one or combination of diagnosed pathology(ies) or medical condition(s) as determined by a veterinary assessment including but not limited to clinical sign(s), veterinary exam(s), diagnostic blood work(s), diagnostic imaging (radiographs, ultrasounds), DNA test(s) and diagnostic cytology/biopsy.

As used herein the "ideal body weight" refers to the measured mass of the animal or the ideal mass of the animal as defined in a unit of weight such as kilograms or pounds. The BCS (body condition score) is a measure of the animal based on the shape of the animal's body from a visual assessment from the side and from above the animal when in a standing position. The BCS assessment also includes a tactile assessment using one's hands to feel the level of the fat mass over the animals ribs (assessment based on how easily or difficult to palpate the ribs). The BCS refers to a score on a scale which typically ranges from 1 to 5, or 1 to 9. Preferably, the Body Condition Score can relate to the 1 to 9 scale, with a score of 5 being an ideal body weight.

As used herein, the term "biological sample" may refer to, but is not limited to, at least one of stool, urine, hair, blood, saliva, and tissue. Indeed, the term, "biological sample" refers not only to the biological material itself (proteins, nucleic acids, tissues, etc.) but also to other materials associated therewith used for detection of the biological material, or portions thereof (e.g., dyes, labels, stains, or any other marker used in the identification of materials). As used herein, "biological material" refers to, for example, a sample of tissue or fluid isolated from a subject, including but not limited to, for example, blood, plasma, serum, fecal matter, urine, bone marrow, bile, spinal fluid, lymph tissue and lymph fluid, samples of the skin, external secretions of the skin, respiratory, intestinal, and genitourinary tracts, tears, saliva, milk, blood cells, organs, biopsies and also samples of in vitro cell culture constituents including but not limited to conditioned media resulting from the growth of cells and tissues in culture medium, e.g., recombinant cells, and cell components. A biological sample can include, for instance, a polypeptide or a polynucleotide, or fragmented portions of organisms or cells obtained from sampling the environment, such as airborne pathogens.

"Polypeptide" as used herein refers to a polymer of amino acids and does not refer to a specific length of a polymer of amino acids. Thus, for example, the terms peptide, oligopeptide, protein, and enzyme are included within the definition of polypeptide. This term also includes post-expression modifications of the polypeptide, for example, glycosylations, acetylations, phosphorylations and the like.

Also, as used herein, the term "polynucleotide" refers to a polymeric form of nucleotides of any length, either ribonucleotides or deoxynucleotides, and includes both double- and single-stranded DNA and RNA. A polynucleotide may include nucleotide sequences having different functions, including for instance coding sequences, and non-coding sequences such as regulatory sequences. A polynucleotide can be obtained directly from a natural source, or can be prepared with the aid of recombinant, enzymatic, or chemical techniques. A polynucleotide can be linear or circular in topology. A polynucleotide can be, for example, a portion of a vector, such as an expression or cloning vector, or a fragment.

As used herein, an amount of a component as expressed as weight/Mcal consists of a weight amount of the said component by unit of Metabolizable Energy (ME) of the total food composition.

As used herein, the "Metabolizable Energy (ME)" refers to the digestible energy minus the energy lost in urine and combustible gases.

As used herein the "Maintenance Energy Requirement (MEI)" is the energy required to support energy equilibrium, where ME equals heat production, over a long period of time. Illustratively, the ME value may be measured using feeding trial. In practice, the gross energy (GE) of the food is determined in the laboratory, and the amounts of food eaten by the animals are recorded. The faeces and urine from the animals are collected, and the energy in each is determined and called faecal energy (FE) and urinary energy (UE), respectively. The ME is then calculated as: ME (kcal/kg)=[GE−(FE+UE)]/Kg of food consumed. Metabolizable Energy is conventionally determinable according to standard methods, and especially according to the European Standard EN 16967 (ICS.65.120) dated of July 2017. Hence, as used herein, the term "x g/Mcal" for a given substance comprised in a diet or foodstuff means that the said substance is comprised in an amount of x grams per Mcal contained in the said diet of foodstuff.

Assuming an energy density of 16.7 kJ (4 kcal) ME per gram of dry matter, the following conversion factors may apply:

Units/100 g of dry matter×2.5=units/1000 kcal.

As used herein, the term "ppm" or "ppm units" (also termed "parts per million"), is another conventional way of specifying an amount of a substance comprised in a composition or a diet.

Generally, a nutritionally complete animal diet, according to the present disclosure, is an animal diet comprising nutrient levels at least at the minimum recommended allowances for commercial compositions and at least below the maximum recommended allowances for commercial compositions.

Conversely, an animal food diet or composition which is not nutritionally complete, according to the disclosure, is generally an animal diet or composition comprising one or more nutrient levels below the minimum recommended allowances for commercial compositions or comprising one or more nutrient levels higher than the maximum recommended allowances for commercial compositions.

According to some embodiments, an animal food diet or composition which is not nutritionally complete, according to the disclosure, may refer to an animal diet or composition comprising a plurality of nutrient levels below the minimum recommended allowances for commercial compositions or to animal diets or compositions comprising one or more nutrient levels higher than the maximum recommended allowances for commercial compositions.

For reference, the recommended nutrient levels for dogs, as expressed in units per 100 g of dry matter (DM) are indicated in Table 1A here below:

TABLE 1A recommended nutrient levels for dogs

| Nutrient | Unit | Minimum Recommended Adult-based on MER of 95 Kcal/kg % DM | Maximum Recommended Adult-based on MER of 95 Kcal/kg % DM |
|---|---|---|---|
| Protein | % | 21 | |
| Arginine | % | 0.6 | |
| Histidine | % | 0.27 | |
| Isoleucine | % | 0.53 | |
| Leucine | % | 0.95 | |
| Lysine | % | 0.46 | |
| Methionine | % | 0.46 | |
| Methionine + Cysteine | % | 0.88 | |
| Phenylalanine | % | 0.63 | |
| Phenylalanine + Tyrosine | % | 1.03 | |
| Threonine | % | 0.6 | |
| Tryptophan | % | 0.2 | |
| Valine | % | 0.68 | |
| Fat | % | 5.5 | |
| Linoleic acid (ω-6) | % | 1.53 | |
| Arachidonic acid (ω-6) | mg/kg | — | |
| Alpha-linolenic acid (ω-3) | % | | |
| EPA + DHA (ω-3) | % | | |
| Minerals | | | |
| Calcium/Phosphorus | ratio | 1 | 2 |
| Calcium | % | 0.58 | 2.5 |
| Phosphorus | % | 0.46 | |
| Potassium | % | 0.58 | |
| Sodium | % | 0.12 | |
| Chloride | % | 0.17 | |
| Magnesium | % | 0.08 | 2.35 |
| Trace elements | | | |
| Copper | ppm | 8.3 | 28 |
| Iodine | ppm | 1.2 | 11 |
| Iron | ppm | 41.7 | 1420 |
| Manganese | ppm | 6.7 | 170 |
| Selenium | ppm | 0.35 | 0.56 |
| Zinc | ppm | 83 | 227 |
| Vitamins | | | |
| Vitamin A | IU/g | 7 | 400 |
| Vitamin D | IU/kg | 639 | 2270 |
| Vitamin E | ppm | 41.7 | |
| Thiamine | mg/kg | 0.25 | |
| Riboflavin | mg/kg | 0.69 | |
| Pantothenic acid | mg/kg | 1.64 | |
| Vitamin B6 (Pyridoxine) | mg/kg | 0.17 | |
| Vitamin B12 | µg/kg | 3.87 | |
| Niacin | mg/kg | 1.89 | |
| Folic acid | µg/kg | 29.9 | |
| Choline | mg/kg | 189 | |

For reference, the recommended nutrient levels for cats, as expressed in units per 100 g of dry matter (DM) are indicated in Table 1B here below:

TABLE 1B recommended nutrient levels for cats

| Nutrient | Unit | % of DM Adult-based on MER of 75 kcal/kg Min recommended | Max recommended |
|---|---|---|---|
| Protein | % | 33.3 | |
| Arginine | % | 1.3 | |
| Histidine | % | 0.35 | |
| Isoleucine | % | 0.57 | |
| Leucine | % | 1.36 | |
| Lysine | % | 0.45 | |
| Methionine | % | 0.23 | |
| Methionine + Cysteine | % | 0.45 | |
| Phenylalanine | % | 0.53 | |
| Phenylalanine + Tyrosine | % | 2.04 | |
| Threonine | % | 0.69 | |
| Tryptophan | % | 0.17 | |
| Valine | g | 0.68 | |
| Taurine | | 0.27 | |
| Fat | % | 9 | |
| Linoleic acid (ω-6) | % | 0.67 | |
| Arachidonic acid (ω-6) | mg/kg | 8 | |
| Alpha-linolenic acid (ω-3) | % | — | |
| EPA + DHA (ω-3) | % | — | |
| Minerals | | | |
| Calcium/Phosphorus | ratio | 1 | 2 |
| Calcium | % | 0.79 | |
| Phosphorus | % | 0.67 | |
| Potassium | % | 0.8 | |
| Sodium | % | 0.1 | 1.5 |
| Chloride | % | 0.15 | 2.25 |
| Magnesium | % | 0.05 | |
| Trace elements | | | |
| Copper | ppm | 6.7 | 28 |
| Iodine | ppm | 1.7 | 11 |
| Iron | ppm | 107 | 1420 |
| Manganese | ppm | 6.7 | 170 |
| Selenium | ppm | 0.4 | 0.57 |
| Zinc | ppm | 100 | 200 |
| Vitamins | | | |
| Vitamin A | IU/g | 4.4 | 400 |
| Vitamin D | IU/kg | 333 | 2270 |
| Vitamin E | ppm | 50.7 | |
| Thiamine | ppm | 5.9 | |
| Riboflavin | mg/kg | 0.42 | |
| Pantothenic acid | mg/kg | 0.77 | |
| Vitamin B6 (Pyridoxine) | mg/kg | 0.33 | |

TABLE 1B-continued recommended nutrient levels for cats

| | | % of DM Adult-based on MER of 75 kcal/kg | |
|---|---|---|---|
| Nutrient | Unit | Min recommended | Max recommended |
| Vitamin B12 | μg/kg | 2.35 | |
| Niacin | mg/kg | 4.21 | |
| Folic acid | μg/kg | 101 | |
| Biotin | μg/kg | 8 | |
| Choline | mg/kg | 320 | |

According to one embodiment, a dry nutritionally complete pet composition, such as a complete dog composition is characterized by the presence of:
- a protein content of at least 18 g per 100 g of dry matter of the total composition;
- a fat content of at least 5.5 g per 100 g of dry matter of the total composition.

Conversely, the corresponding dry non-nutritionally complete pet (i.e. dog) composition can be characterized by the presence of:
- a protein content below 18 g per 100 g of dry matter of the total composition; and/or
- a fat content below 5.5 g per 100 g of dry matter of the total composition.

According to one embodiment, a dry nutritionally complete pet composition, such as a complete cat composition is characterized by the presence of:
- a protein content of at least 25 g per 100 g of dry matter of the total composition;
- a fat content of at least 9 g per 100 g of dry matter of the total composition.

Conversely, the corresponding dry non-nutritionally complete pet (i.e. cat) composition can be characterized by the presence of:
- a protein content below 25 g per 100 g of dry matter of the total composition; and/or
- a fat content below 9 g per 100 g of dry matter of the total composition As used herein, the term "sequential" or "sequentially" means that information is input in a successive manner such that a first portion of information is input at a first time, a second portion of information is input at a second time subsequent to the first time, and so on. The time between sequential inputs can be, for example, one or several days, weeks, months, or the like.

The term "user" as used herein includes, for example, a person or entity that owns a computing device or wireless device; a person or entity that operates or utilizes a computing device or a wireless device; or a person or entity that is otherwise associated with a computing device or wireless device. For instance, the term "user" may be used to refer to any type of individual consumer, customer, researcher and/or the like that receives and/or transmits information from/to a user interface. Users include, but are not limited to, pet owners, veterinarians, manufacturers, organizations, wholesalers, vendors, members and/or the like. It is contemplated that the term "user" is not intended to be limiting and may include various examples beyond those described.

As used herein, the term "reference database" means the proprietary set of growth references, charts, data points, graphs, media, code, and information for animals of specific sex, breed, and/or size, among other measurable factors.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "analyzing" or the like, may be achieved through the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

General Ways of Implementing the Method

According to a first main embodiment, the present disclosure relates to a method for providing an individualized nutritionally complete diet for an animal, in particular an animal with one or more pathological condition(s), the method comprising the steps of:

a) providing an individual physiological profile of an animal, and optionally an individual pathological profile of the animal, from one or more values indicative of a physiological status, and optionally from a medical status, of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal, whereby an individualized nutritionally complete diet is provided; wherein none of the said selected distinct pre-made dry compositions consists of a nutritionally complete diet alone, said nutritionally complete diet being defined as including at least one source of proteins, at least one source of vitamins, at least one source of fats and at least one source of minerals.

In a non-exhaustive manner, the dry food diet obtained by means of a method or process described herein may be in the form of a diet or foodstuff, which can encompass any dry product which a pet consumes in its diet. Thus, the present disclosure covers standard food products as well as pet food snacks (for example, snack bars, biscuits and sweet products).

The nutritionally complete diet or foodstuff may be manufactured by mixing together ingredients and kneading in order to make consistent dough or meat emulsion that can be cooked. The process of creating an embodiment of a dry pet food is usually done by baking and/or extruding. The dough is typically fed into a machine called an expander and/or extruder, which uses pressurized steam or water to cook the ingredients. While inside the extruder, the dough is under extreme pressure and high temperatures. The dough is then pushed through a die (specifically sized and shaped hole) and then cut off using a knife. The puffed dough pieces are made into kibble by passing it through a dryer so that moisture is dropped down to a defined target ensuring stability of the food until consumption. The dry composition (i.e. the kibble) can then be sprayed with fats, oils, minerals, vitamins, the natural extracts cocktail, palatants and optionally sealed into packages.

The above-mentioned method may further include a step of combining the at least 2 distinct pre-made dry compositions selected at step c), whereby the individualized nutritionally complete diet is provided.

Hence, the present disclosure further relates to a method for providing an individualized nutritionally complete diet for an animal, in particular an animal with one or more pathological condition(s), the method comprising the steps of:

a) providing an individual physiological profile of an animal, and optionally an individual pathological profile of the animal, from one or more values indicative of a physiological status, and optionally of a medical status, of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal;

d) combining the at least 2 distinct pre-made dry compositions, whereby an individualized nutritionally complete diet is provided; wherein none of the said selected distinct pre-made dry compositions consists of a nutritionally complete diet alone, said nutritionally complete diet being defined as including at least one source of proteins, at least one source of vitamins, at least one source of fats and at least one source of minerals.

According to another embodiment, the present disclosure relates to a method for providing an individualized nutritionally complete diet for an animal, the method comprising the steps of:

a) providing an individual physiological profile of an animal from one or more values indicative of a physiological status of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal;

d) combining the at least 2 pre-made distinct dry compositions selected at step c) to obtain an individualized nutritionally complete diet;

wherein none of the said selected distinct pre-made dry compositions comprises a nutritionally complete diet alone.

According to another embodiment, the present disclosure relates to a method for providing an individualized nutritionally complete diet for an animal with one or more pathological condition(s), the method comprising the steps of:

a) providing an individual physiological profile of an animal from one or more values indicative of a physiological status of the said animal;

b) providing an individual medical profile of an animal from one or more values indicative of a medical status of the said animal, whereby an individual general profile is generated;

c) providing an individual general profile of the said animal based on the said individual physiological profile and said individual medical profile;

d) processing the individual general profile, whereby a nutrient formula specific to the said animal is determined;

e) selecting at least 2 distinct pre-made dry compositions from a plurality of distinct pre-made dry compositions, each of a known constitution, based on the nutrient formula specific to said animal; and f) combining the at least 2 pre-made distinct dry compositions selected at step e) to obtain an individualized nutritionally complete diet;

wherein none of the said selected distinct pre-made dry compositions comprises a nutritionally complete diet alone.

According to another embodiment, the present disclosure relates to a method for providing an individualized nutritionally complete diet for an animal with one or more pathological condition(s), the method comprising the steps of:

a) providing an individual physiological and an individual medical profile of an animal from one or more values indicative of a physiological and of a medical status of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal;

d) combining the at least 2 pre-made distinct dry compositions selected at step c) to obtain an individualized nutritionally complete diet;

wherein none of the said selected distinct pre-made dry compositions comprises a nutritionally complete diet alone.

In a more preferred embodiment, the individualized nutritionally complete diet comprises at least one source of proteins, at least one source of vitamins, at least one source of fats and at least one source of minerals.

In addition to the individual general animal profile created based on user input, the user may be also requested to input information obtained from a biological sample of the animal.

The analysis provides information that enhances the animal profile information and is used to modify and refine the animal dry food composition by suggesting a different pre-manufactured dry composition, adding specific additive ingredients, removing specific additive ingredients, and/or changing the amount of any included additive ingredient from the pet product formulation to enable the new formulation to better meet the needs of the pet. In one embodiment, the additional nutritional and biological analyses information is conveyed to the animal's veterinarian to recommend potential therapeutic components to the diet or a therapeutic treatment if appropriate. In an alternative embodiment, the veterinarian conveys the nutritional and biological analyses information to an animal food manufacturer.

The method for providing an individualized nutritionally complete diet for an animal, according to the present disclosure, may thus also include an additional in vitro or ex vivo step of providing a biological sample from the animal, and determining an attribute of a physiological or pathological condition on said sample, thereby providing (or enriching a pre-existing) individual general profile of said animal.

Hence, in some embodiments, the present disclosure further relates to a method for providing an individualized nutritionally complete diet for an animal, in particular an animal with one or more pathological condition(s), the method including the steps of:

a) providing an individual physiological profile of an animal, and optionally an individual pathological profile of the animal, from one or more values indicative of a physiological status, and optionally of a medical status, of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal, whereby an individualized nutritionally complete diet is provided; wherein none of the said selected distinct pre-made dry compositions consists of a nutritionally complete diet alone, said nutritionally complete diet being defined as including at least one source of proteins, at least one source of vitamins, at least one source of fats and at least one source of minerals, and wherein at least one value indicative of an individual pathological status of the said animal is/was determined from a biological sample of the said animal.

Hence, the disclosure further relates to a method for providing an individualized nutritionally complete diet for an animal, in particular an animal with one or more pathological condition(s), the method including the steps of:

a) providing a biological sample from the animal, and determining an attribute of a physiological or pathological condition on said sample;

b) providing an individual physiological profile of the animal, and optionally an individual pathological profile of the animal, from one or more values indicative of a physiological status, and optionally of a medical status, of the animal, including at least one attribute determined whereby an individual general profile is generated;

c) processing the individual general profile, whereby a nutrient formula specific to the said animal is determined;

d) selecting at least 2 distinct pre-made dry compositions from a plurality of distinct pre-made dry compositions, each of a known constitution, based on the nutrient formula specific to said animal, whereby an individualized nutritionally complete diet is provided; wherein none of the said selected distinct pre-made dry compositions consists of a nutritionally complete diet alone, said nutritionally complete diet being defined as comprising at least one source of proteins, at least one source of vitamins, at least one source of fats and at least one source of minerals.

According to a particular embodiment of the methods disclosed herein, the step of selecting at least 2 distinct pre-made dry compositions from a plurality of distinct pre-made dry compositions may include selecting at least 3, 4, 5 or even more than 5 distinct pre-made dry compositions from a plurality of distinct pre-made dry compositions.

According to a particular embodiment of the methods disclosed herein, the said pre-made dry compositions are selected from a set of 5 or more distinct pre-made compositions.

According to a particular embodiment of the methods disclosed herein, the said pre-made dry compositions are selected from at least 6, 7, 8, 9 or more distinct pre-made dry compositions.

According to a particular embodiment of the disclosure, the at least 5 distinct pre-made dry compositions are selected from a plurality of distinct pre-made dry compositions.

According to a particular embodiment, none of the set of distinct pre-made dry compositions addresses individually a specific pathological condition.

As already detailed, the disclosed methods are suitable for providing an individualized nutritionally complete diet for an animal, from distinct pre-made dry compositions, of which none consists of nor comprises a nutritionally complete diet alone.

For the sake of clarity, dry compositions are meant to have a moisture level of, at most, 20% relative to the total weight of the composition. Hence, according to one embodiment, such pre-made dry compositions have a moisture level ranging from 1% to 20% relative to the total weight of the composition. However, it will be readily understood that the moisture level of such dry compositions may be significantly below 20%, which hence includes below 1, 2, 3, 4, 5, 6, 7, 8, 9, 10, 11, 12, 13, 14, 15, 16, 17, 18, 19, 20% relative to the total weight of the pre-made composition. According to one preferred embodiment, the pre-made dry compositions have a moisture level below 25% relative to the total weight of the composition; or even below 15% relative to the total weight of the composition. According to one embodiment, the pre-made dry compositions consist of dry kibbles.

According to one particular embodiment, the animal is a companion animal such as a pet. Most preferably, the animal is selected from a feline or a canine animal; such as a dog or a cat.

According to one embodiment, the plurality of distinct pre-made dry compositions comprises at least one or more distinct composition(s) selected from the group consisting of, or even consists of:

(i) composition A with at least 1.5% of Sodium, at least 38% of protein and no more than 10% of fat, relative to the total weight of the composition on a dry-matter basis; (ii) composition B with at least 0.5% of *Psyllium* Tegument, at least 35% of protein, at least 0.5% of calcium and no more than 0.7% of Phosphorus, relative to the total weight of the composition on a dry-matter basis;

(iii) composition C with at least 37% of protein, at least 1.5% of Sodium, at least 2.5% of chloride and at least 0.6% of EPA and/or DHA, relative to the total weight of the composition on a dry-matter basis;

(iv) composition D with at least 20% of TDF, at least 38% of protein, no more than 9% of fat and at least 1.3% of Potassium, relative to the total weight of the composition on a dry-matter basis;

(v) composition E with at least 3.5% of linoleic acid, at least 0.4% of Phosphorus and no more than 7% of TDF, relative to the total weight of the composition on a dry-matter basis;

(vi) composition F with at least 0.55% of EPA and/or DHA, relative to the total weight of the composition on a dry-matter basis;

(vii) composition G with at least 0.8% of EPA and/or DHA and at least 1.5% of Sodium, relative to the total weight of the composition on a dry-matter basis;

(viii) composition H with at least 20% of fat, no more than 0.5% of Calcium and at least 5% of linoleic acid, relative to the total weight of the composition on a dry-matter basis; and (ix) composition I with at least 4% of *Psyllium* Tegument, relative to the total weight of the composition on a dry-matter basis;

(x) composition J with no more than 6 ppm of total copper, relative to the total weight of the composition on a dry-matter basis; wherein none of the said pre-made distinct dry compositions consists of a nutritionally complete diet alone.

According to one embodiment, the present disclosure relates to a method for providing an individualized nutritionally complete diet for a cat, in particular a cat with one or more pathological condition(s), the method comprising the steps of:

a) providing an individual physiological profile of a cat, and optionally an individual pathological profile of the cat, from one or more values indicative of a physiological status, and optionally a medical status, of the said cat, whereby an individual general profile is generated;

b) processing the individual general profile, whereby a nutrient formula specific to the said cat is determined;

c) selecting at least 2 distinct pre-made dry compositions from a plurality of distinct pre-made dry compositions, each of a known constitution, based on the nutrient formula specific to said animal, whereby an individualized nutritionally complete diet is provided;

wherein none of the said selected distinct pre-made dry compositions consists of a nutritionally complete diet alone;

and wherein said at least one or more pre-made dry composition are selected from the group consisting of:

(i) composition A with at least 1.5% of Sodium, at least 38% of protein and no more than 10% of fat, relative to the total weight of the composition on a dry-matter basis;

(ii) composition B with at least 0.5% of *Psyllium* Tegument, at least 35% of protein, at least 0.5% of calcium and no more than 0.7% of Phosphorus, relative to the total weight of the composition on a dry-matter basis;

(iii) composition C with at least 37% of protein, at least 1.5% of Sodium, at least 2.5% of chloride and at least 0.6% of EPA and/or DHA, relative to the total weight of the composition on a dry-matter basis;

(iv) composition D with at least 20% of TDF, at least 38% of protein, no more than 9% of fat and at least 1.3% of Potassium, relative to the total weight of the composition on a dry-matter basis;

(v) composition E with at least 3.5% of linoleic acid, at least 0.4% of Phosphorus and no more than 7% of TDF, relative to the total weight of the composition on a dry-matter basis;

(vi) composition F with at least 0.55% of EPA and/or DHA, relative to the total weight of the composition on a dry-matter basis;

(vii) composition G with at least 0.8% of EPA and/or DHA and at least 1.5% of Sodium, relative to the total weight of the composition on a dry-matter basis;

(viii) composition H with at least 20% of fat, no more than 0.5% of Calcium and at least 5% of linoleic acid, relative to the total weight of the composition on a dry-matter basis; and (ix) composition I with at least 4% of *Psyllium* Tegument, relative to the total weight of the composition on a dry-matter basis;

(x) composition J with no more than 6 ppm of total copper, relative to the total weight of the composition on a dry-matter basis.

According to one embodiment, the plurality of distinct pre-made dry compositions comprises at least one or more, distinct composition(s) selected from the group consisting of, or even consists of:

(i) composition A' with at least 1.7% of Sodium and no more than 10% of fat, relative to the total weight of the composition on a dry-matter basis;

(ii) composition B' with at least 40% of protein and at least 1.5% of calcium, relative to the total weight of the composition on a dry-matter basis;

(iii) composition C' with no more than 6% of fat and no more than 0.45% of Calcium & Phosphorus, relative to the total weight of the composition on a dry-matter basis;

(iv) composition D' with at least 22% of fat, at least 0.55% of EPA and/or DHA and at least 5% of linoleic acid, relative to the total weight of the composition on a dry-matter basis;

(v) composition E' with no more than 7% of fat, at least 25% of TDF and at least 35% of protein, relative to the total weight of the composition on a dry-matter basis;

(vi) composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

(vii) composition G' with no more than 0.35% of Calcium, no more than 0.35% of phosphorus, at least 1.6% of Sodium and at least 25% of TDF, relative to the total weight of the composition on a dry-matter basis:

(viii) composition H' with no more than 6% of fat and at least 1.6% of sodium, relative to the total weight of the composition on a dry-matter basis;

(ix) composition I' with no more than 0.21% of Sodium and at least 1.65% of total arginine, relative to the total weight of the composition on a dry-matter basis;

(x) composition J' with no more than 6 ppm of total copper and no more than 20% of fat, relative to the total weight of the composition on a dry-matter basis;

(xi) composition K' with at least 40% of protein and no more than 23% of starch, relative to the total weight of the composition on a dry-matter basis; and (xii) composition L' with at least 21% of total dietary fiber, relative to the total weight of the composition on a dry-matter basis;

wherein none of the said pre-made distinct dry compositions consists of a nutritionally complete diet alone.

According to one embodiment, the present disclosure relates to a method for providing an individualized nutritionally complete diet for a dog, in particular a dog with one or more pathological condition(s), the method comprising the steps of:

a) providing an individual physiological profile of a dog, and optionally an individual pathological profile of the dog, from one or more values indicative of a physiological status, and optionally a medical status, of the said dog, whereby an individual general profile is generated;

b) processing the individual general profile, whereby a nutrient formula specific to the said dog is determined;

c) selecting at least 2 distinct pre-made dry compositions from a plurality of distinct pre-made dry compositions, each of a known constitution, based on the nutrient formula specific to said animal, whereby an individualized nutritionally complete diet is provided;

wherein none of the said selected distinct pre-made dry compositions consists of a nutritionally complete diet alone;

and wherein said at least one or more pre-made dry composition are selected from the group consisting of:

(i) composition A' with at least 1.7% of Sodium and no more than 10% of fat, relative to the total weight of the composition on a dry-matter basis;

(ii) composition B' with at least 40% of protein and at least 1.5% of calcium, relative to the total weight of the composition on a dry-matter basis;

(iii) composition C' with no more than 6% of fat and no more than 0.45% of Calcium & Phosphorus, relative to the total weight of the composition on a dry-matter basis;

(iv) composition D' with at least 22% of fat, at least 0.55% of EPA and/or DHA and at least 5% of linoleic acid, relative to the total weight of the composition on a dry-matter basis;

(v) composition E' with no more than 7% of fat, at least 25% of TDF and at least 35% of protein, relative to the total weight of the composition on a dry-matter basis;

(vi) composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

(vii) composition G' with no more than 0.35% of Calcium, no more than 0.35% of phosphorus, at least 1.6% of Sodium and at least 25% of TDF, relative to the total weight of the composition on a dry-matter basis;

(viii) composition H' with no more than 6% of fat and at least 1.6% of sodium, relative to the total weight of the composition on a dry-matter basis;

(ix) composition I' with no more than 0.21% of Sodium and at least 1.65% of total arginine, relative to the total weight of the composition on a dry-matter basis;

(x) composition J' with no more than 6 ppm of total copper and no more than 20% of fat, relative to the total weight of the composition on a dry-matter basis;

(xi) composition K' with at least 40% of protein and no more than 23% of starch, relative to the total weight of the composition on a dry-matter basis; and (xii) composition L' with at least 21% of total dietary fiber, relative to the total weight of the composition on a dry-matter basis.

According to one embodiment, the plurality of distinct pre-made dry compositions comprises at least one or more distinct composition(s) selected from the group consisting of, or even consists of:

composition A with at least 1.5% of Sodium, at least 38% of protein and no more than 10%/6 of fat, relative to the total weight of the composition on a dry-matter basis;

composition B with at least 0.5% of *Psyllium* Tegument, at least 35% of protein, at least 0.5% of calcium and no more than 0.7% of Phosphorus, relative to the total weight of the composition on a dry-matter basis;

composition C with at least 37% of protein, at least 1.5% of Sodium, at least 2.5% of chloride and at least 0.6% of EPA and/or DHA, relative to the total weight of the composition on a dry-matter basis;

composition D with at least 20% of TDF at least 38% of protein, no more than 9% of fat and at least 1.3% of Potassium, relative to the total weight of the composition on a dry-matter basis;

composition E with at least 3.5% of linoleic acid, at least 0.4% of Phosphorus and no more than 7% of TDF, relative to the total weight of the composition on a dry-matter basis;

composition F with at least 0.55% of EPA and/or DHA, relative to the total weight of the composition on a dry-matter basis;

composition G with at least 0.8% of EPA/DHA and at least 1.5% of Sodium, relative to the total weight of the composition on a dry-matter basis;

composition H with at least 20% of fat, no more than 0.5% of Calcium and at least 5% of linoleic acid, relative to the total weight of the composition on a dry-matter basis;

composition I with at least 4% of *Psyllium* Tegument, relative to the total weight of the composition on a dry-matter basis;

composition J with no more than 6 ppm of total copper, relative to the total weight of the composition on a dry-matter basis;

composition A' with at least 1.7% of Sodium and no more than 10% of fat, relative to the total weight of the composition on a dry-matter basis;

composition B' with at least 40% of protein and at least 1.5% of calcium, relative to the total weight of the composition on a dry-matter basis;

composition C' with no more than 6% of fat and no more than 0.45% of Calcium & Phosphorus, relative to the total weight of the composition on a dry-matter basis;

composition D' with at least 22% of fat, at least 0.55% of EPA and/or DHA and at least 5% of linoleic acid, relative to the total weight of the composition on a dry-matter basis;

composition E' with no more than 7% of fat, at least 25% of TDF and at least 35% of protein, relative to the total weight of the composition on a dry-matter basis;

composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

composition G' with no more than 0.35% of Calcium, no more than 0.35% of phosphorus, at least 1.6% of Sodium and at least 25% of TDF, relative to the total weight of the composition on a dry-matter basis;

composition H' with no more than 6% of fat and at least 1.6% of sodium, relative to the total weight of the composition on a dry-matter basis;

composition I' with no more than 0.21% of Sodium and at least 1.65% of total arginine, relative to the total weight of the composition on a dry-matter basis;

composition J' with no more than 6 ppm of total copper and no more than 20% of fat, relative to the total weight of the composition on a dry-matter basis;

composition K' with at least 40% of protein and no more than 23% of starch, relative to the total weight of the composition on a dry-matter basis;

composition L' with at least 21% of total dietary fiber, relative to the total weight of the composition on a dry-matter basis;

wherein none of the said pre-made distinct dry compositions consists of a nutritionally complete diet alone.

According to one embodiment, the present disclosure relates to a method for providing an individualized nutritionally complete diet for a pet, in particular a pet with one or more pathological condition(s), the method comprising the steps of:

a) providing an individual physiological profile of a pet, and optionally an individual pathological profile of the pet, from one or more values indicative of a physiological status, and optionally of a medical status, of the said pet, whereby an individual general profile is generated;

b) processing the individual general profile, whereby a nutrient formula specific to the said pet is determined;

c) selecting at least 2 distinct pre-made dry compositions from a plurality of distinct pre-made dry compositions, each of a known constitution, based on the nutrient formula specific to said animal, whereby an individualized nutritionally complete diet is provided;

wherein none of the said selected distinct pre-made dry compositions consists of a nutritionally complete diet alone; and wherein said at least one or more pre-made dry composition are selected from the group consisting of:

(i) composition A with at least 1.5% of Sodium, at least 38% of protein and no more than 10% of fat, relative to the total weight of the composition on a dry-matter basis;

(ii) composition B with at least 0.5% of *Psyllium* Tegument, at least 35% of protein, at least 0.5% of calcium and no more than 0.7% of Phosphorus, relative to the total weight of the composition on a dry-matter basis;

(iii) composition C with at least 37% of protein, at least 1.5% of Sodium, at least 2.5% of chloride and at least 0.6% of EPA and/or DHA, relative to the total weight of the composition on a dry-matter basis;

(iv) composition D with at least 20% of TDF, at least 38% of protein, no more than 9% of fat and at least 1.3% of Potassium, relative to the total weight of the composition on a dry-matter basis;

(v) composition E with at least 3.5% of linoleic acid, at least 0.4% of Phosphorus and no more than 7% of TDF, relative to the total weight of the composition on a dry-matter basis;

(vi) composition F with at least 0.55% of EPA and/or DHA, relative to the total weight of the composition on a dry-matter basis;

(vii) composition G with at least 0.8% of EPA and/or DHA and at least 1.5% of Sodium, relative to the total weight of the composition on a dry-matter basis;

(viii) composition H with at least 20% of fat, no more than 0.5% of Calcium and at least 5% of linoleic acid, relative to the total weight of the composition on a dry-matter basis; and (ix) composition I with at least 4% of *Psyllium* Tegument, relative to the total weight of the composition on a dry-matter basis;

(x) composition J with no more than 6 ppm of total copper, relative to the total weight of the composition on a dry-matter basis;

(xi) composition A' with at least 1.7% of Sodium and no more than 10% of fat, relative to the total weight of the composition on a dry-matter basis;

(xii) composition B' with at least 40% of protein and at least 1.5% of calcium, relative to the total weight of the composition on a dry-matter basis;

(xiii) composition C' with no more than 6% of fat and no more than 0.45% of Calcium & Phosphorus, relative to the total weight of the composition on a dry-matter basis;

(xiv) composition D' with at least 22% of fat, at least 0.55% of EPA and/or DHA and at least 5% of linoleic acid, relative to the total weight of the composition on a dry-matter basis;

(xv) composition E' with no more than 7% of fat, at least 25% of TDF and at least 35% of protein, relative to the total weight of the composition on a dry-matter basis;

(xvi) composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

(xvii) composition G' with no more than 0.35% of Calcium, no more than 0.35% of phosphorus, at least 1.6% of Sodium and at least 25% of TDF, relative to the total weight of the composition on a dry-matter basis;

(xviii) composition H' with no more than 6% of fat and at least 1.6% of sodium, relative to the total weight of the composition on a dry-matter basis;

(xix) composition I' with no more than 0.21% of Sodium and at least 1.65% of total arginine, relative to the total weight of the composition on a dry-matter basis;

(xx) composition J' with no more than 6 ppm of total copper and no more than 20% of fat, relative to the total weight of the composition on a dry-matter basis;

(xi) composition K' with at least 40% of protein and no more than 23% of starch, relative to the total weight of the composition on a dry-matter basis;

(xii) composition L' with at least 21% of total dietary fiber, relative to the total weight of the composition on a dry-matter basis;

Hence, according to one embodiment, the method may include a step of selecting at least 2 distinct pre-made dry compositions from a plurality of the distinct pre-made dry compositions disclosed above, such as those selected from, or even consisting of:

(i) composition A with at least 1.5% of Sodium, at least 38% of protein and no more than 10% of fat, relative to the total weight of the composition on a dry-matter basis;

(ii) composition B with at least 0.5% of *Psyllium* Tegument, at least 35% of protein, at least 0.5% of calcium and no more than 0.7% of Phosphorus, relative to the total weight of the composition on a dry-matter basis;

(iii) composition C with at least 37% of protein, at least 1.5% of Sodium, at least 2.5% of chloride and at least 0.6% of EPA and/or DHA, relative to the total weight of the composition on a dry-matter basis;

(iv) composition D with at least 20% of TDF, at least 38% of protein, no more than 9% of fat and at least 1.3% of Potassium, relative to the total weight of the composition on a dry-matter basis;

(v) composition E with at least 3.5% of linoleic acid, at least 0.4% of Phosphorus and no more than 7% of TDF, relative to the total weight of the composition on a dry-matter basis;

(vi) composition F with at least 0.55% of EPA and/or DHA, relative to the total weight of the composition on a dry-matter basis;

(vii) composition G with at least 0.8% of EPA and/or DHA and at least 1.5% of Sodium, relative to the total weight of the composition on a dry-matter basis;

(viii) composition H with at least 20% of fat, no more than 0.5% of Calcium and at least 5% of linoleic acid, relative to the total weight of the composition on a dry-matter basis; and (ix) composition I with at least 4% of *Psyllium* Tegument, relative to the total weight of the composition on a dry-matter basis;

(x) composition J with no more than 6 ppm of total copper, relative to the total weight of the composition on a dry-matter basis;

wherein none of the said pre-made distinct dry compositions consists of a nutritionally complete diet alone.

According to another embodiment, the method may include a step of selecting at least 2 distinct pre-made dry compositions from a plurality of the distinct pre-made dry compositions disclosed above, such as those selected from, or even consisting of:

(i) composition A' with at least 1.7% of Sodium and no more than 10% of fat, relative to the total weight of the composition on a dry-matter basis;

(ii) composition B' with at least 40% of protein and at least 1.5% of calcium, relative to the total weight of the composition on a dry-matter basis;

(iii) composition C' with no more than 6% of fat and no more than 0.45% of Calcium & Phosphorus, relative to the total weight of the composition on a dry-matter basis;

(iv) composition D' with at least 22% of fat, at least 0.55% of EPA and/or DHA and at least 5% of linoleic acid, relative to the total weight of the composition on a dry-matter basis;

(v) composition E' with no more than 7% of fat, at least 25% of TDF and at least 35% of protein, relative to the total weight of the composition on a dry-matter basis;

(vi) composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

(vii) composition G' with no more than 0.35% of Calcium, no more than 0.35% of phosphorus, at least 1.6% of Sodium and at least 25% of TDF, relative to the total weight of the composition on a dry-matter basis;

(viii) composition H' with no more than 6% of fat and at least 1.6% of sodium, relative to the total weight of the composition on a dry-matter basis;

(ix) composition I' with no more than 0.21% of Sodium and at least 1.65% of total arginine, relative to the total weight of the composition on a dry-matter basis;

(x) composition J' with no more than 6 ppm of total copper and no more than 20% of fat, relative to the total weight of the composition on a dry-matter basis;

(xi) composition K' with at least 40% of protein and no more than 23% of starch, relative to the total weight of the composition on a dry-matter basis;

(xii) composition L' with at least 21% of total dietary fiber, relative to the total weight of the composition on a dry-matter basis;

wherein none of the said pre-made distinct dry compositions consists of nor comprises a nutritionally complete diet alone.

The step of selecting at least 2 distinct pre-made dry compositions from the plurality of the distinct pre-made dry compositions may comprise or consist of selecting at least 3, 4, 5 or 6 distinct pre-made dry compositions.

The selected distinct pre-made dry compositions may then be mixed, and optionally further processed (which may thus include being heated, cooled down, grinded and/or lyophilized), in order to provide the individualized nutritionally complete diet.

The individualized nutritionally complete diet, and/or the pre-made dry compositions may be presented as a powder or crumbs, including a white powder or solid form. A powder is useful to be added on the main food of the animal. Other forms include solid pellets, granules, tablets.

Processing the Individual General Profile

The term "physiological profile" refers to any one or combination of attributes of an animal including its specie, breed, sex, neuter status, size, weight, age, activity level, disposition, state of wellness and medical history. A physiological profile is a product of interaction of the genotype with the environment of the animal. A subpopulation defined at least in part by physiological profile can cut across breed lines. Alternatively, a subpopulation can be defined in part by physiological condition but restricted to one or a few breeds or a defined breed heritage. Examples of such subpopulations are aggressive poodles, Labrador retrievers with tapeworm infestation, spayed female dogs having a breed heritage that includes beagle, etc.

The term "pathological profile" or "medical profile" refers to any one or combination of attributes including an indication for a set of pathological conditions which have been associated to a given animal, or which are suspected to be present in said animal. For example, a subpopulation can consist of adult cats that shed hair excessively, obese dogs, toy dogs having respiratory disease, geriatric dogs of large breed type, long-haired cats having renal insufficiency, etc.

The term "general profile" encompasses the physiological profile and the pathological profile.

Hence, the animal general profile can be composed of answers to questions pertaining to, but not limited to, an animal's name, species, age, weight, gender, breed, spayed/neutered, activity level, breeding status, digestive health, medical history and genetic information, current health status, body condition, feeding method, snack schedule and flavor preferences. Further, the animal profile may also include information regarding the season, date or time of year.

According to one particular embodiment, the method may include a step of providing an individual physiological profile of an animal from one or more values indicative of a general status of the said animal, which are selected in the group consisting of: animal's breed, animal's age, animal's actual weight, animal's targeted weight, animal's Body Condition Score (BCS), animal's activity, animal's lifestyle, animal's sexual status, animal's gestation status.

According to another embodiment, the method can comprise a step of providing an individual pathological profile of an animal from one or more values indicative of a medical status of the said animal.

According to an embodiment, the animal has one or more pathological conditions.

In a non-limitative manner, the disorders/pathologies listed in the public VENOM DATABASE (venomcoding.org) or in the public AAHA (American Animal Hospital Association) listing from the Veterinary Terminology Services Laboratory (https://vtsl.vetmed.vt.edu/aaha/) can be considered for the establishment of a physiological or pathological profile. More preferably, in another non-limitative manner, the following set of disorders/pathologies can be considered for the establishment of a physiological or pathological profile:

| | |
|---|---|
| Behavioral Disorders | Stress and Anxiety Related Disorders, Chronic Anxiety |
| Dermatological Disorders | Self-Induced Alopecia, Adverse Food Reactions (Afr), Adverse Food Reactions Suspicion, Atopic Dermatitis (Atopy), Dermatitis, Flea Bite Allergic Dermatitis, Pyoderma, Skin and Coat Disorders Wound Healing, Coat Color Disorder (Incl Red Coat Syndrome), Cutaneous Afr, Dermatosis, Hair Loss, Pyodermatitis |
| Endocrine Disorders | Diabetes Mellitus (Dm), Hypothyroidism, Diabetes Mellitus Type 1 (Absolute Insulin Deficiency), Diabetes Mellitus Type 2 (Relative Insulin Deficiency or Insulin Resistance), Hyperthyroidism, Thyroid Disorders |
| Food Intake Disorders | Anorexia, Dysrexia, Food Intake Disorders |
| Gastro-Intestinal Disorders | Acute Diarrhea, Acute Gastroenteritis, Acute Vomiting, Chronic Diarrhea, Chronic Enteropathy (Ce), Chronic Gastroenteritis, Chronic Vomiting, Constipation, Fibre Responsive Colitis (Including Stress Diarrhea), Gastrointestinal Afr, Gastrointestinal Condition Requiring High Fibre Content, Inflammatory Bowel Disease (Ibd), Intestinal Diseases, Lymphangiectasia, Maldigestion Malabsorption, Megacolon, Megaoesophagus, Perianal Fistula, Protein-Losing Enteropathy (Ple), Acute Colitis, Antibiotic Responsive Diarrhea (Ard), Chronic Colitis, |

| | -continued |
|---|---|
| Behavioral Disorders | Stress and Anxiety Related Disorders, Chronic Anxiety |
| | Chronic Idiopathic Large Bowel Disease (Cilbd), Delayed Gastric Emptying, Feline Triaditis (Enteritis + Cholangiohepatitis + Pancreatitis), Food Responsive Diarrhea (Frd), Functional Colopathy , Gastric Dilatation Volvulus (Recurrence Prevention), Gastric Disorders, Gastritis, Obstipation, Oesophagial Disorders, Oesophagitis, Small Intestinal Bacterial Overgrowth (Sibo), Steroid (Or Immunosuppressant) Responsive Diarrhea (Srd Or Ird) |
| Heart Disorders | Cardiovascular Diseases, Congestive Heart Failure (Chf), Hypertrophic Cardiomyopathy (Hcm), Dilated Cardiomyopathy (Dcm), Chronic Valvular Heart Disease (Cvhd) |
| Liver Disorders | Cholangiohepatitis, Cholangitis, Copper Storage Disease, Feline Hepatic Lipidosis, Hepatic Encephalopathy, Liver Diseases, Acute Hepatitis, Chronic Hepatitis, Liver Failure, Portosystemic Shunt (Pss) |
| Oral Disorders | Periodontal Disease, Dental Plaque, Gingivitis, Oral Diseases, Tartar |
| Osteoarticular Disorders | Bone Disorders, Joint Disorders, Osteoarthritis, Osteo-Articular Disorders, Osteochondritis |
| Other | Regurgitation, Malnutrition, Food Intolerance (Including Gluten Intolerance), Hairball Management, Anemia, Hyperlipidemia (Fasting Hyperlipidemia), Neoplasia (Cancer), Neurologic Diseases, Convalescence, Hypertension, Sarcopenia |
| Pancreatic Disorders | Acute Pancreatitis, Chronic Pancreatitis, Exocrine Pancreatic Insufficiency (Epi), Pancreatic Disorders (Exocrine Pancreas), Chronic Pancreatitis (Mild Moderate), Chronic Pancreatitis (Severe) |
| Renal Disorders | Acute Kidney Injury (Aki), Azotemic Ckd Iris Stage 2, Azotemic Ckd Iris Stage 3, Azotemic Ckd Iris Stage 4, Ckd With Proteinuria, Early Ckd (Iris Stage 1), Chronic Kidney Disease (Ckd), Ckd Mineral Bone Disorder (Secondary Hyperparathyroidism), Ckd With Hypertension, Glomerulonephritis, Kidney Dysplasia, Polycystic Kidney Disease (Pkd), Protein-Losing Nephropathy (Pln) |
| Urinary Disorders | Feline Idiopathic Cystitis (Fic), Urinary Tract Infection (Uti), Urolithiasis Calcium Oxalate (Or Calcium Phosphate), Urolithiasis Cystine, Urolithiasis Struvite, Urolithiasis Urate (Or Xanthine), Hematuria, Incontinence, Proteinuria, Urinary Disorders, Urolithiasis Undetermined |
| Weight Disorders | Obesity, Overweight, Underweight, Cachexia , Obesity Bcs 7 (Out Of 9), Obesity Bcs 8 (Out Of 9), Obesity Bcs 9 (Out Of 9), Overweight Bcs 6 (Out Of 9), Underweight Bcs 1 (Out Of 9), Underweight Bcs 2 (Out Of 9), Underweight Bcs 3 (Out Of 9) |

In addition to the listed pathologies, it can also be taken into consideration another presentation list of "sensitivities" (part of pathology): Weight Gain, Struvite Urolithiasis, Oxalate Urolithiasis, Cystine Urolithiasis, Xanthine Urolithiasis, Idiopathic Cystitis, Stress and Anxiety, Bone and Joint, Skin and Coat Sensitivity, Gastrointestinal Sensitivity, Tartar, Fussy Eater, Hairball, Prone Cardiac In a non-limitative manner, the following set of breeds can be considered for the establishment of a physiological or pathological profile: feline, canine, dogs, cats, rabbits, hamsters, guinea pigs, rats and mice. Preferred pet animals herein are feline or canine, such as dogs and cats. In a non-limitative manner, when the animal is a feline, the following set of breed can be considered for the establishment of a physiological or pathological profile: cheetah, puma, jaguar, leopard, lion, lynx, liger, tiger, panther, bobcat, ocelot, smilodon, caracal, serval and cats. As used herein, cats encompass wild cats and domestic cats, and most preferably domestic cats. In a non-limitative manner, when the animal is a canine, the following set of breed can be considered for the establishment of a physiological or pathological profile: afghan hound, airedale, akita, Alaskan malamute, basset hound, beagle, Belgian shepherd, bloodhound, border collie, border terrier, borzoi, boxer, bulldog, bull terrier, cairn terrier, chihuahua, chow, cocker spaniel, collie, corgi, dachshund, dalmatian, Doberman, English setter, fox terrier, German shepherd, golden retriever, great Dane, greyhound, griffon bruxellois, Irish setter, Irish wolfhound, King Charles spaniel, Labrador retriever, Lhasa Apso, mastiff, newfoundland, old English sheepdog, Papillion, Pekingese, pointer, Pomeranian, poodle, pug, rottweiler, St. Bernard, saluki, Samoyed, schnauzer, Scottish terrier, Shetland sheepdog, shih tzu, Siberian husky, Skye terrier, springer spaniel, West Highland terrier, whippet, Yorkshire terrier.

According to one general embodiment, the method may include a step of providing an individual pathological profile of a pet; wherein the one or more values indicative of a medical status of the said pet are selected from:
 disorders associated to obesity and/or weight;
 food allergies;
 kidney disorders at an early stage;
 kidney disorders at a late stage:
 urinary disorders linked to calcium oxalate;
 urinary disorders linked to struvite;
 gastro-intestinal disorders;
 disorders linked to a fat-rich diet;
 skin disorders (i.e. dermatitis);

dental disorders;
age-related disorders;
joint disorders.

According to one embodiment, the method may comprise a step of providing an individual pathological profile of a cat, wherein the one or more values indicative of a medical status of the said cat are selected from:
disorders associated to obesity and/or weight;
food allergies;
kidney disorders at an early stage;
kidney disorders at a late stage;
urinary disorders linked to calcium oxalate;
urinary disorders linked to struvite;
gastro-intestinal disorders;
disorders linked to a fat-rich diet;
skin disorders (i.e. dermatitis);
dental disorders;
age-related disorders.

According to one embodiment, the method may comprise a step of providing an individual pathological profile of a dog, wherein the one or more values indicative of a medical status of the said dog are selected from:
disorders associated to obesity and/or weight;
kidney disorders at an early stage;
kidney disorders at a late stage;
urinary disorders linked to calcium oxalate;
urinary disorders linked to struvite;
gastro-intestinal disorders;
disorders linked to a fat-rich diet;
skin disorders (i.e. dermatitis);
dental disorders;
age-related disorders.
joint disorders Disorders associated to obesity and/or weight generally require a low-energy low-fat protein-rich and fiber-rich diet. Food allergies generally require a hypoallergenic diet. Kidney disorders at an early stage generally require a low-phosphorus diet. Kidney disorders at a late stage generally require a low-phosphorous and a low-protein diet. Urinary disorders linked to calcium oxalate generally require a sodium-rich diet without acidification. Urinary disorders linked to struvite generally require a sodium-rich diet with acidification. Gastro-intestinal disorders generally require a highly digestible protein source and a fiber-specific diet (including for instance *psyllium*). Disorders linked to a fat-rich diet generally require a fat-low diet. Skin disorders (i.e. dermatitis) generally require a vitamin B-rich and EPA/DHA rich diet. Dental disorders generally require a calcium-chelating diet.

According to one particular embodiment, the method may include a step of providing an individual physiological profile of a cat, and optionally an individual pathological profile of the cat: wherein the one or more values indicative of a medical status of the said cat are selected from Post weight loss, Overweight, Obesity, Osteoarthritis, Mobility risk factors, Chronic Kidney Disease (CKD) Stage I or II, CKD Stage III or IV, Proteinuria, Struvite urolith dissolution, Struvite urolith prevention, Calcium Oxalate urolith (CaOx) prevention, Calcium Phosphate urolih (CaP) prevention, Idiopathic cystitis, Poor skin and coat, Atopy, non-food related dermatopathies, Dental Calculus, Acute or chronic diarrhea, Acute or chronic vomiting, Gastritis, Enteritis, Colitis, Maldigestion, Malabsorption, Diabetes mellitus, Pancreatitis, Exocrine pancreatic insufficiency (EPI), and Hyperlipidemia.

According to one particular embodiment, the method may include a step of providing an individual physiological profile of a dog, and optionally an individual pathological profile of the dog; wherein the one or more values indicative of a medical status of the said cat are selected from Post weight loss, Overweight, Obesity, Osteoarthritis, Mobility risk factors, CKD (Chronic Kidney Disease) Stage I or II, CKD Stage III or IV, Proteinuria, Struvite urolith dissolution, Struvite urolith prevention, Calcium Oxalate urolith (CaOx) prevention, Calcium Phosphate urolith (CaP) prevention, Idiopathic cystitis, Poor skin and coat, Atopy, non-food related dermatopathies, Dental Calculus, Acute or chronic diarrhea, Acute or chronic vomiting, Gastritis, Enteritis, Colitis, Maldigestion, Malabsorption, Diabetes mellitus, Pancreatitis, Exocrine pancreatic insufficiency (EPI), Hyperlipidemia, and Adverse food reaction.

According to some embodiments, more than one nutrient formula specific to the said animal is provided. For instance, two or more than two nutrient formulae can be provided. Such a situation may, for instance, occur when the individual general profile is generated from one or more values indicative of a physiological and/or medical status of the said animal, which when associated, lead to a plurality of antagonistic nutritional answers. In this particular case, the method may require an additional step, referred herein as prioritization, which requires to adapt the set of values indicative of a physiological and/or medical profiles in a manner suitable to generate only a limited set (i.e. only one) of nutrient formulae specific to the said animal.

Hence, according to this embodiment, the method of the disclosure for providing an individualized nutritionally complete diet for an animal, in particular an animal with one or more pathological condition(s), may include the steps of:
a) providing an individual physiological profile of an animal, and optionally an individual pathological profile of the animal, from one or more values indicative of a physiological status, and optionally of a medical status, of the said animal, whereby an individual general profile is generated;
b) processing the individual general profile, and optionally discarding one or more of the values indicatives of a physiological/or medical status which were provided in the preceding step, whereby a nutrient formula specific to the said animal is determined;
c) selecting at least 2 distinct pre-made dry compositions from a plurality of distinct pre-made dry compositions, each of a known constitution, based on the nutrient formula specific to the said animal, whereby an individualized nutritionally complete diet is provided;
wherein none of the said selected distinct pre-made dry compositions consists of a nutritionally complete diet alone.

Alternatively, two or more than two nutrient formulae specific to the said animal can be provided, and a selection of one optimal nutrient formula can then be achieved through an additional step, referred herein as duplication. For instance, the step of selecting the individualized optimal nutrient formulae among the plurality may consist in discarding or ignoring one or more values indicative of the physiological and/or medical status of the said animal based on a user preference, so that only one individualized nutritionally complete diet is finally provided.

According to this embodiment, the method of the disclosure for providing an individualized nutritionally complete diet for an animal, in particular an animal with one or more pathological condition(s), may include the steps of:
a) providing an individual physiological profile of an animal, and optionally an individual pathological profile of the animal, from one or more values indicative of a physiological status, and optionally of a medical status, of the said animal, whereby an individual general profile is generated;

b) processing the individual general profile, whereby a plurality of nutrient formulae specific to the said animal is determined;

c) selecting, among the plurality of nutrient formulae specific to the said animal, one or more individualized optimal nutrient formulae;

d) selecting at least 2 distinct pre-made dry compositions from a plurality of distinct pre-made dry compositions, each of a known constitution, based on the optimal nutrient formulae specific to said animal, whereby an individualized nutritionally complete diet is provided;

wherein none of the said selected distinct pre-made dry compositions consists of a nutritionally complete diet alone.

It will be understood herein that, according to the previous example, the step of selecting a set of nutrient formulae among a plurality within step c) can be itself achieved through an automatic procedure, or alternatively through manual input (i.e. through a particular user interface).

According to some embodiments, both duplication and prioritization can be achieved within a same sequence.

Hence, according to those embodiments, one or more of the values indicatives of a general status can be discarded, and a plurality of optimal nutrient formulae can be generated.

According to this embodiment, the method described in the present disclosure for providing an individualized nutritionally complete diet for an animal, in particular an animal with one or more pathological condition(s), may include the steps of:

a) providing an individual physiological profile of an animal, and optionally an individual pathological profile of the animal, from one or more values indicative of a physiological status, and optionally of a medical status, of the said animal, whereby an individual general profile is generated;

b) processing the individual general profile, and optionally discard one or more of the values indicatives of a physiological and/or medical status which were provided in the preceding step, whereby a plurality of nutrient formulae specific to the said animal is determined;

c) selecting, among the plurality of nutrient formulae specific to the said animal, one or more individualized optimal nutrient formulae;

d) selecting at least 2 distinct pre-made dry compositions from a plurality of distinct pre-made dry compositions, each of a known constitution, based on the optimal nutrient formulae specific to said animal, whereby an individualized nutritionally complete diet is provided;

wherein none of the said selected distinct pre-made dry compositions consists of a nutritionally complete diet alone.

Providing the Individualized Nutritionally Complete Diet

It will be readily understood herein that the provision of an individualized nutritionally complete diet from pre-made dry compositions can be achieved through the same device as the one responsible for the other steps of the method. Yet, it could be achieved through another device, or even remotely.

According to this embodiment, the step of providing the individualized nutritionally complete diet may include the step of the selected distinct pre-made dry compositions to be transported to specific locations, such as retail locations.

Also, the step of providing the individualized nutritionally complete diet may immediately follow the step of selecting the at least 2 distinct pre-made dry composition; or alternatively it may occur at a different time. For instance, such pre-made dry compositions may be stored over a certain time, and the step of providing the individualized nutritionally complete diet from those pre-made dry compositions may occur at a later time and at a different place.

The individualized nutritionally complete diet which is obtained according to the method is a nutritionally complete composition, in the form of a diet or foodstuff, which can encompass any product which a pet consumes in its diet. Thus, the present disclosure covers standard food products as well as pet food snacks (for example, snack bars, biscuits and sweet products). The individualized nutritionally complete diet herein is preferably a cooked product. It may incorporate meat or animal derived material (such as a material derived from beef, chicken, turkey, pork, duck, kangaroo, lamb or fish, blood plasma, bone marrow, feather-derived material (e.g. feather hydrolysate such as poultry feather hydrolysate) etc.

The individualized nutritionally complete diet alternatively may be meat free and may include a meat substitute such as soya, maize gluten or a soya hydrolysate in order to provide a protein source. The individualized nutritionally complete diet may contain additional protein sources such as vegetal protein (wheat gluten, pea protein) or soya protein concentrate or hydrolysate, milk proteins, gluten etc. The individualized nutritionally complete diet may also contain a starch source such as one or more grains (e.g. wheat, corn, rice, oats, barley etc.), or carbohydrates coming from other sources such as potato or may be starch free. The individualized nutritionally complete diet may include fiber such as chicory, sugar beet pulp, etc. and/or components such as inulin, fructooligosaccharides, probiotics, most preferably, the combined ingredients of the diet or foodstuff provide all the recommended vitamins and minerals for the particular animal in question (a complete and balanced food) for example as described in National Research Council, 1985, Nutritional Requirements for dogs, National Academy Press, Washington D.C. or Association of America Feed Control Officials, Official Publication 1996.

Device for Performing the Method & Computer-Implemented Inventions

In some aspects, the present disclosure relates to a device/apparatus for performing the methods for preparing the individualized nutritionally complete dry food diet described herein. This apparatus may be specially constructed for the required purposes, or it may include a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

As will be appreciated by one of ordinary skill in the art, the systems and methods disclosed herein can be embodied as a method, a data processing system, a device for data processing, and/or a computer program product. Accordingly, the disclosed systems and methods can take the form of an entirely software embodiment, an entirely hardware embodiment, and/or an embodiment combining aspects of both software and hardware. Furthermore, the disclosed systems and methods can take the form of a computer program product on a computer-readable storage medium having computer-readable program code means embodied in the storage medium. Any suitable computer-readable storage medium can be utilized, including hard disks, CD-ROM, optical storage devices, magnetic storage devices, and/or the like.

The algorithms and displays presented herein are not inherently related to any particular computer or other apparatus. Various general purpose systems may be used with programs in accordance with the teachings herein, or it may prove convenient to construct a more specialized apparatus to perform the required method operations. The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may receive customized information relating to an animal's health and/or optimal growth as displayed on a graphical user interface based on data input relating to a specific animal. Furthermore, the user may customize, via a selection of at least one biomarker, the information received, such as animal growth or health information, displayed on a graphical user interface from which the software application may apply and display relevant health information and/or an intervention recommendation.

The present disclosure may thus be present in the form of a device (i.e. a computer system and/or a software application platform) which provides a user with the ability to receive customized information relating to an animal's health and/or optimal growth as displayed on a graphical user interface based on data input relating to a specific animal. Specifically, a user may input data, for example, an animal specific biomarker, and subsequently receive identification relating to a specific subgroup of individual animal(s).

In another embodiment, a device (i.e. a computer system and/or a software application platform) for providing an individualized nutritionally complete diet for an animal is disclosed. The device may include a processor and a memory storing instructions that, when executed by the processor, cause the device (i.e. the computer system and/or the software application platform) to carry out the method described supra.

For example, the device (i.e. the computer system) can employ various integrated circuit components (e.g., memory elements, processing elements, logic elements, look-up tables, and the like), which can carry out a variety of functions under the control of one and/or more microprocessors and/or other control devices. Similarly, the software elements can be implemented with any programming and/or scripting language such as C, C++, Java, COBOL, assembler, PERL, Visual Basic, SQL Stored Procedures, extensible markup language (XML), hypertext markup language (HTML), SDML, DHTML, HDML, VRML, with the various algorithms being implemented with any combination of data structures, objects, processes, routines and/or other programming elements. Further, the device could employ any number of conventional techniques for data transmission, signaling, data processing, network control, and the like.

In yet another embodiment, a non-transitory computer-readable medium, storing instructions that, when executed by a processor, cause a device (i.e. a computer system) to provide an individualized nutritionally complete diet for an animal is disclosed.

The device (i.e. the computer system) may perform the method operations described supra. The device/system may further include a user interface, especially an electronic user interface, configured to obtain a user input, including one or more values indicative of a general status of the said animal. Hence, according to this embodiment, the electronic user interface may be configured to obtain a user input including one or more values selected from: an animal's name, species, age, weight, gender, breed, spayed/neutered, activity level, breeding status, digestive health, medical history and genetic information, current health status, body condition, feeding method, snack schedule and flavor preferences.

According to one embodiment, the device/system may further include an ordering device configured to contact a server.

According to one embodiment, the present disclosure relates to a device for providing an individualized nutritionally complete diet for an animal, having means adapted to execute the steps of:

a) providing an individual physiological profile of an animal from one or more values indicative of a physiological status of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal;

d) combining the at least 2 pre-made distinct dry compositions selected at step c) to obtain an individualized nutritionally complete diet;

wherein none of the said selected distinct pre-made dry compositions comprises a nutritionally complete diet alone.

In one other embodiment of the disclosure, the device has a further mean adapted to execute the step of providing an individual pathological profile of an animal from one or more values indicative of a medical status of the said animal.

According to one embodiment, the present disclosure relates to a device for providing an individualized nutritionally complete diet for an animal with one or more pathological condition(s), having means adapted to execute the steps of:

a) providing an individual physiological profile and an individual pathological profile of an animal from one or more values indicative of a physiological status and of a medical status of the said animal, whereby an individual general profile is generated;

b) processing the individual general profile, whereby a nutrient formula specific to the said animal is determined;

c) selecting at least 2 distinct pre-made dry compositions from a plurality of distinct pre-made dry compositions, each of a known constitution, based on the nutrient formula specific to said animal;

d) combining the at least 2 pre-made distinct dry compositions selected at step c) to obtain an individualized nutritionally complete diet;

wherein none of the said selected pre-made distinct dry compositions comprises a nutritionally complete diet alone.

Kits

The present description provides also provides a kit for preparing a nutritionally complete diet for an animal, preferentially a companion animal, the said nutritionally complete diet includes at least 2 or more distinct dry compositions selected from the group consisting of:
composition A with at least 1.5% of Sodium, at least 38% of protein and no more than 10% of fat, relative to the total weight of the composition on a dry-matter basis;
composition B with at least 0.5% of *Psyllium* Tegument, at least 35% of protein, at least 0.5% of calcium and no more than 0.7% of Phosphorus, relative to the total weight of the composition on a dry-matter basis;
composition C with at least 37% of protein, at least 1.5% of Sodium, at least 2.5% of chloride and at least 0.6% of EPA and/or DHA, relative to the total weight of the composition on a dry-matter basis;
composition D with at least 20% of TDF, at least 38% of protein, no more than 9% of fat and at least 1.3% of Potassium, relative to the total weight of the composition on a dry-matter basis;
composition E with at least 3.5% of linoleic acid, at least 0.4% of Phosphorus and no more than 7% of TDF, relative to the total weight of the composition on a dry-matter basis;
composition F with at least 0.55% of EPA and/or DHA, relative to the total weight of the composition on a dry-matter basis;
composition G with at least 0.8% of EPA/DHA and at least 1.5% of Sodium, relative to the total weight of the composition on a dry-matter basis;
composition H with at least 20% of fat, no more than 0.5% of Calcium and at least 5% of linoleic acid, relative to the total weight of the composition on a dry-matter basis;
composition I with at least 4% of *Psyllium* Tegument, relative to the total weight of the composition on a dry-matter basis;
composition J with no more than 6 ppm of total copper, relative to the total weight of the composition on a dry-matter basis;
composition A' with at least 1.7% of Sodium and no more than 10% of fat, relative to the total weight of the composition on a dry-matter basis;
composition B' with at least 40% of protein and at least 1.5% of calcium, relative to the total weight of the composition on a dry-matter basis;
composition C' with no more than 6% of fat no more than 0.45% of Calcium and no more than 0.45% of Phosphorus, relative to the total weight of the composition on a dry-matter basis;
composition D' with at least 22% of fat, at least 0.55% of EPA and/or DHA and at least 5% of linoleic acid, relative to the total weight of the composition on a dry-matter basis;
composition E' with no more than 7% of fat, at least 25% of TDF and at least 35% of protein, relative to the total weight of the composition on a dry-matter basis;
composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;
composition G' with no more than 0.35% of Calcium, no more than 0.35% of phosphorus, at least 1.6% of Sodium and at least 25% of TDF, relative to the total weight of the composition on a dry-matter basis;
composition H' with no more than 6% of fat and at least 1.6% of sodium, relative to the total weight of the composition on a dry-matter basis;
composition I' with no more than 0.21% of Sodium and at least 1.65% of total arginine, relative to the total weight of the composition on a dry-matter basis;
composition J' with no more than 6 ppm of total copper and no more than 20% of fat, relative to the total weight of the composition on a dry-matter basis;
composition K' with at least 40% of protein and no more than 23% of starch, relative to the total weight of the composition on a dry-matter basis;
composition L' with at least 21% of total dietary fiber, relative to the total weight of the composition on a dry-matter basis;
wherein none of the said distinct pre-made dry compositions consists of a nutritionally complete diet alone.

In particular, the present description provides a kit for preparing a nutritionally complete diet, comprising at least 2 or more distinct dry compositions selected from the group consisting of:
composition A with at least 1.5% of Sodium, at least 38% of protein and no more than 10% of fat, relative to the total weight of the composition on a dry-matter basis;
composition B with at least 0.5% of *Psyllium* Tegument, at least 35% of protein, at least 0.5% of calcium and no more than 0.7% of Phosphorus, relative to the total weight of the composition on a dry-matter basis;
composition C with at least 37% of protein, at least 1.5% of Sodium, at least 2.5% of chloride and at least 0.6% of EPA and/or DHA, relative to the total weight of the composition on a dry-matter basis;
composition D with at least 20% of TDF, at least 38% of protein, no more than 9% of fat and at least 1.3% of Potassium, relative to the total weight of the composition on a dry-matter basis;
composition E with at least 3.5% of linoleic acid, at least 0.4% of Phosphorus and no more than 7% of TDF, relative to the total weight of the composition on a dry-matter basis;
composition F with at least 0.55% of EPA and/or DHA, relative to the total weight of the composition on a dry-matter basis;
composition G with at least 0.8% of EPA/DHA and at least 1.5% of Sodium, relative to the total weight of the composition on a dry-matter basis;
composition H with at least 20% of fat, no more than 0.5% of Calcium and at least 5% of linoleic acid, relative to the total weight of the composition on a dry-matter basis;
composition I with at least 4% of *Psyllium* Tegument, relative to the total weight of the composition on a dry-matter basis;
composition J with no more than 6 ppm of total copper, relative to the total weight of the composition on a dry-matter basis.

Alternatively, the disclosure relates to a kit for preparing a nutritionally complete diet for a feline, preferentially a cat, comprising at least 2 or more distinct dry compositions selected from the group consisting of:
composition A with at least 1.5% of Sodium, at least 38% of protein and no more than 10% of fat, relative to the total weight of the composition on a dry-matter basis;
composition B with at least 0.5% of *Psyllium* Tegument, at least 35% of protein, at least 0.5% of calcium and no more than 0.7% of Phosphorus, relative to the total weight of the composition on a dry-matter basis;

composition C with at least 37% of protein, at least 1.5% of Sodium, at least 2.5% of chloride and at least 0.6% of EPA and/or DHA, relative to the total weight of the composition on a dry-matter basis;

composition D with at least 20% of TDF at least 38% of protein, no more than 9% of fat and at least 1.3% of Potassium, relative to the total weight of the composition on a dry-matter basis;

composition E with at least 3.5% of linoleic acid, at least 0.4% of Phosphorus and no more than 7% of TDF, relative to the total weight of the composition on a dry-matter basis;

composition F with at least 0.55% of EPA and/or DHA, relative to the total weight of the composition on a dry-matter basis;

composition G with at least 0.8% of EPA and/or DHA, and at least 1.5% of Sodium, relative to the total weight of the composition on a dry-matter basis;

composition H with at least 20% of fat, no more than 0.5% of Calcium and at least 5% of linoleic acid, relative to the total weight of the composition on a dry-matter basis;

composition I with at least 4% of *Psyllium* Tegument, relative to the total weight of the composition on a dry-matter basis;

composition J with no more than 6 ppm of total copper, relative to the total weight of the composition on a dry-matter basis;

wherein none of the said distinct pre-made dry compositions consists of a nutritionally complete diet alone.

Alternatively, the present disclosure provides a kit for preparing a nutritionally complete diet, comprising at least 2 or more distinct dry compositions selected from the group consisting of:

composition A' with at least 1.7% of Sodium and no more than 10% of fat, relative to the total weight of the composition on a dry-matter basis;

composition B' with at least 40% of protein and at least 1.5% of calcium, relative to the total weight of the composition on a dry-matter basis;

composition C' with no more than 6% of fat, no more than 0.45% of Calcium and no more than 0.45% of Phosphorus, relative to the total weight of the composition on a dry-matter basis;

composition D' with at least 22% of fat, at least 0.55% of EPA and/or DHA and at least 5% of linoleic acid, relative to the total weight of the composition on a dry-matter basis;

composition E' with no more than 7% of fat, at least 25% of TDF and at least 35% of protein, relative to the total weight of the composition on a dry-matter basis;

composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

composition G' with no more than 0.35% of Calcium, no more than 0.35% of phosphorus, at least 1.6% of Sodium and at least 25% of TDF, relative to the total weight of the composition on a dry-matter basis;

composition H' with no more than 6% of fat and at least 1.6% of sodium, relative to the total weight of the composition on a dry-matter basis;

composition I' with no more than 0.21% of Sodium and at least 1.65% of total arginine, relative to the total weight of the composition on a dry-matter basis;

composition J' with no more than 6 ppm of total copper and no more than 20% of fat, relative to the total weight of the composition on a dry-matter basis;

composition K' with at least 40% of protein and no more than 23% of starch, relative to the total weight of the composition on a dry-matter basis;

composition L' with at least 21% of total dietary fiber, relative to the total weight of the composition on a dry-matter basis;

wherein none of the said distinct pre-made dry compositions consists of a nutritionally complete diet alone.

Alternatively, the present disclosure provides a kit for preparing a nutritionally complete diet for a canine, preferentially a dog, comprising at least 2 or more distinct dry compositions selected from the group consisting of:

composition A' with at least 1.7% of Sodium and no more than 10% of fat, relative to the total weight of the composition on a dry-matter basis;

composition B' with at least 40% of protein and at least 1.5% of calcium, relative to the total weight of the composition on a dry-matter basis;

composition C' with no more than 6% of fat, no more than 0.45% of Calcium and no more than 0.45% of Phosphorus, relative to the total weight of the composition on a dry-matter basis;

composition D' with at least 22% of fat, at least 0.55% of EPA and/or DHA and at least 5% of linoleic acid, relative to the total weight of the composition on a dry-matter basis;

composition E' with no more than 7% of fat, at least 25% of TDF and at least 35% of protein, relative to the total weight of the composition on a dry-matter basis;

composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

composition G' with no more than 0.35% of Calcium, no more than 0.35% of phosphorus, at least 1.6% of Sodium and at least 25% of TDF, relative to the total weight of the composition on a dry-matter basis;

composition H' with no more than 6% of fat and at least 1.6% of sodium, relative to the total weight of the composition on a dry-matter basis;

composition I' with no more than 0.21% of Sodium and at least 1.65% of total arginine, relative to the total weight of the composition on a dry-matter basis;

composition J' with no more than 6 ppm of total copper and no more than 20% of fat, relative to the total weight of the composition on a dry-matter basis;

composition K' with at least 40% of protein and no more than 23% of starch, relative to the total weight of the composition on a dry-matter basis;

composition L' with at least 21% of total dietary fiber, relative to the total weight of the composition on a dry-matter basis;

wherein none of the said pre-made distinct dry compositions consists of a nutritionally complete diet alone.

EXAMPLE

Case Study: Senior Pet with Urinary Stones and Obese
The pathological pet profile is reported herein.

| Category | Input | Comment |
| --- | --- | --- |
| Species | Cat/Dog | select the right algo and product solution portfolio |
| Breed | Breed list | Lifestage calculation and ration calculation |
| Birth date | DD/MM/YY | Lifestage calculation (growth, adult, senior), impact on nutritional answer (link to one nutrional answer/binary code) |
| BCS | 1 to 9 | used to calculate the ideal body weight and determine if the pet needs weight management program |
| Weight | X Kg | ration calculation |
| Pathologies | As reported in the Venom list and the AAHA list Intern list | The pathologies are sort out based on their nutritional answer. Pathologies with the same nutritional answers are grouped together and are represented by the same binary code |

The pet profile is then represented with a binary code. Each code represents a nutritional answer. Each binary code is linked to an ideal nutritional answer that will determine the formula to recommend. Additional rules can be introduced, which link the binary code to nutritional answers. These rules are based on pathological associations. Each answer can be prioritized or duplicated.

An example of prioritization may occur when a pet is presenting renal issue and dental issue. Both nutritional answers can be defined as antagonist (i.e. in that particular case, it is advisable to reduce phosphorus due to the occurrence of a renal issue; however an advisable dental nutritional answer may require or be based on a phosphorus addition).

In this particular case, the renal issue can be prioritized over the dental issue. The algorithm is then going to deprioritize the binary code associated with the dental issue (binary code from 1 to 0), while retaining only the binary code associated with the renal issue.

An example of duplication may occur when a pet is presenting renal issue and urinary stones issue. Both nutritional answers can be defined as antagonist (i.e. it is advisable to reduce sodium in one case and increase it in the other). The goal to be achieved is to treat either one, or both, issues. Hence, two profiles are then generated (10; 01), and the answer is sent to the practitioner who can then decide the one he wants to keep.

Example 1: Process Applied to a Dog

1. Individual Physiological and Pathological Profile

| | |
| --- | --- |
| Species | Dog |
| Breed | Jack Russell Terrier |
| Birth Date | Nov. 11, 2015 (Adult lifestage) |
| BC (Body Condition Score) | 8 |
| Weight | 8.2 Kg |
| Pathology | Skin and coat disorder & Obesity |

2. Nutritional Formula Profile
For Obesity:
Specific level of energy density, specific level of fiber with a selection of fiber sources with satietogenic effect for the animal, specific level of EPA+DHA, addition of L-carnitine, specific level of protein and specific level of essential nutrients on an energy basis.

For Skin and Coat Disorder
Specific level of fatty acid (especially but without limitation Linoleic acid. Alpha Linolenic, Acid, and Gamma linolenic acid), specific level of B vitamin (without limitation Pantothenic acid, Niacin, Cholin), specific level of Histidine, specific level of Zinc.

3. Selection from a Set of Pre-Made Dry Compositions

| | % of Dry-Matter for each pre-made composition, per Dry-Matter of the total individualized animal composition |
| --- | --- |
| Composition A' | 0.00% |
| Composition B' | 27.67% |
| Composition C' | 0.00% |
| Composition D' | 0.00% |
| Composition E' | 49.18% |
| Composition F' | 0.00% |
| Composition G' | 23.15% |
| Composition H' | 0.00% |
| Composition I' | 0.00% |

(*) Recommended daily calorie intake: 278 Kcal; and based on a BCS score of 8, the ideal Body weight calculated is 6.3 kg.

Example 2: Process Applied to a Cat

1. Individual Physiological and Pathological Profile

| | |
| --- | --- |
| Species | Cat |
| Breed | Bengal |
| Birth Date | Mar. 12, 2010 (Senior lifestage) |
| BC (Body Condition Score) | 5 |
| Weight | 4.2 kg |
| Pathology | Osteoarthritis & Skin and Coat disorder |

2. Nutritional Formula Profile
For Senior Lifestage:
Selection of highly digestible ingredient (i.e. rice as source of cereal) and highly digestible protein, specific level of protein and fat, specific level of phosphorus, addition of an antioxidant blend (including, in particular, a specific level of vitamin C, E, Lutein, Taurine, Betacarotene and Lycopene).

For Osteoarthritis:

Specific level of EPA and DHA, addition and without limitation of a blend of green leap mussel extract, of chondroitin, and of glucosamin.

For Skin and Coat Disorder

Specific level of fatty acid (especially but without limitation Linoleic acid, Alpha Linolenic, Acid, and Gamma linolenic acid), specific level of B vitamin (without limitation Pantothenic acid, Niacin, Cholin), specific level of Histidine, specific level of Zinc.

3. Selection from a Set of Pre-Made Dry Compositions

| | % of Dry-Matter for each pre-made composition, per Dry-Matter of the total individualized animal composition (*) |
|---|---|
| Composition A | 0.00% |
| Composition B | 36.9% |
| Composition C | 0.00% |
| Composition D | 5.6% |
| Composition E | 16.2% |
| Composition F | 7.8% |
| Composition G | 16.0% |
| Composition H | 17.5% |
| Composition I | 0.00% |

(*) Recommended daily calorie intake: 215 Kcal; and based on a BCS score of 5, the ideal Body weight calculated is 4.2 kg.

The invention claimed is:

1. A method for providing an individualized nutritionally complete diet for an animal, the method comprising the steps of:
   a) providing an individual physiological profile of an animal from one or more values indicative of a physiological status of the said animal, whereby an individual general profile is generated;
   b) processing the individual general profile, whereby a nutrient formula specific to the said animal is determined;
   c) selecting at least 2 distinct pre-made pellet-like dry kibble compositions from a plurality of distinct pre-made dry compositions consisting of pellet-like dry kibbles, each of a known constitution, based on the nutrient formula specific to said animal;
   d) combining the at least 2 pre-made distinct pellet-like dry kibble compositions selected at step c) to obtain an individualized nutritionally complete diet;
   wherein none of the said selected distinct pre-made pellet-like dry kibble compositions comprises a nutritionally complete diet alone.

2. The method according to claim 1, further comprising a step of providing an individual pathological profile of an animal from one or more values indicative of a medical status of the said animal.

3. The method according to claim 1, wherein at least 5 distinct pre-made pellet-like dry kibble compositions are selected from the plurality of distinct pre-made dry compositions.

4. The method according to claim 1, wherein each of the pre-made dry compositions has a moisture level ranging from 1% to 14% relative to the total weight of the pre-made dry composition.

5. The method according to claim 1, wherein the one or more values indicative of the physiological status of the said animal are selected from animal's breed, animal's age, animal's actual weight, animal's targeted weight, animal's Body Condition Score (BCS), animal's activity, animal's lifestyle, animal's sexual status, and animal's gestation status.

6. The method according to claim 2, wherein the animal is a cat and the one or more values indicative of the medical status of the said animal are selected from Post weight loss, Overweight, Obesity, Osteoarthritis, Mobility risk factors, Chronic Kidney Disease (CKD) Stage I or II, CKD Stage III or IV, Proteinuria, Struvite urolith dissolution, Struvite urolith prevention, Calcium Oxalate urolith (CaOx) prevention, Calcium Phosphate urolith (CaP) prevention, Idiopathic cystitis, Poor skin and coat, Atopy, non-food related dermatopathies, Dental Calculus, Acute or chronic diarrhea, Acute or chronic vomiting, Gastritis, Enteritis, Colitis, Maldigestion, Malabsorption, Diabetes mellitus, Pancreatitis, Exocrine pancreatic insufficiency (EPI), and Hyperlipidemia.

7. The method according to claim 2, wherein the said animal is a dog and the one or more values indicative of the medical status of the said animal are selected from Post weight loss, Overweight, Obesity, Osteoarthritis, Mobility risk factors, CKD Stage I or II, CKD Stage III or IV, Proteinuria, Struvite urolith dissolution, Struvite urolith prevention, Calcium Oxalate urolith (CaOx) prevention, Calcium Phosphate urolith (CaP) prevention, Idiopathic cystitis, Poor skin and coat, Atopy, non-food related dermatopathies, Dental Calculus, Acute or chronic diarrhea, Acute or chronic vomiting, Gastritis, Enteritis, Colitis, Maldigestion, Malabsorption, Diabetes mellitus, Pancreatitis, Exocrine pancreatic insufficiency (EPI), Hyperlipidemia, and Adverse food reaction.

8. The method of claim 2, wherein the animal has one or more pathological conditions.

9. The method according to claim 1, which consists of a computer-implemented method.

10. The method of claim 1, wherein the nutritionally complete diet comprises at least one source of proteins, at least one source of vitamins, at least one source of fats and at least one source of minerals.

11. A device for providing an individualized nutritionally complete diet for an animal, wherein the device is configured to execute the steps of:
   a) providing an individual physiological profile of an animal from one or more values indicative of a physiological status of the said animal, whereby an individual general profile is generated;
   b) processing the individual general profile, whereby a nutrient formula specific to the said animal is determined;
   c) selecting at least 2 distinct pre-made pellet-like dry kibble compositions from a plurality of distinct pre-made dry compositions consisting of pellet-like dry kibbles, each of a known constitution, based on the nutrient formula specific to said animal;
   d) combining the at least 2 pre-made distinct pellet-like dry kibble compositions selected at step c) to obtain an individualized nutritionally complete diet;
   wherein none of the said selected pre-made pellet-like dry kibble compositions comprises a nutritionally complete diet.

12. A device according to claim 11, is further configured to execute the step of providing an individual pathological profile of an animal from one or more values indicative of a medical status of the said animal.

13. A computer program comprising instructions to cause the device according to claim 11 to execute the steps of the method.

14. A computer-readable medium having stored thereon the computer program according to claim 13.

15. A kit for preparing a nutritionally complete diet, comprising at least 2 pellet-like dry kibble compositions selected from the group consisting of:

composition A with at least 1.5% of Sodium, at least 38% of protein and no more than 10% of fat, relative to the total weight of the composition on a dry-matter basis;

composition B with at least 0.5% of Psyllium Tegument, at least 35% of protein, at least 0.5% of calcium and no more than 0.7% of Phosphorus, relative to the total weight of the composition on a dry-matter basis;

composition C with at least 37% of protein, at least 1.5% of Sodium, at least 2.5% of chloride and at least 0.6% of EPA and/or DHA, relative to the total weight of the composition on a dry-matter basis;

composition D with at least 20% of TDF, at least 38% of protein, no more than 9% of fat and at least 1.3% of Potassium, relative to the total weight of the composition on a dry-matter basis;

composition E with at least 3.5% of linoleic acid, at least 0.4% of Phosphorus and no more than 7% of TDF, relative to the total weight of the composition on a dry-matter basis;

composition F with at least 0.55% of EPA and/or DHA, relative to the total weight of the composition on a dry-matter basis;

composition G with at least 0.8% of EPA/DHA and at least 1.5% of Sodium, relative to the total weight of the composition on a dry-matter basis;

composition H with at least 20% of fat, no more than 0.5% of Calcium and at least 5% of linoleic acid, relative to the total weight of the composition on a dry-matter basis;

composition I with at least 4% of Psyllium Tegument, relative to the total weight of the composition on a dry-matter basis;

composition J with no more than 6ppm of total copper, relative to the total weight of the composition on a dry-matter basis;

composition A' with at least 1.7% of Sodium and no more than 10% of fat, relative to the total weight of the composition on a dry-matter basis;

composition B' with at least 40% of protein and at least 1.5% of calcium, relative to the total weight of the composition on a dry-matter basis;

composition C' with no more than 6% of fat, no more than 0.45% of Calcium and no more than 0.45% of Phosphorus, relative to the total weight of the composition on a dry-matter basis;

composition D' with at least 22% of fat, at least 0.55% of EPA and/or DHA and at least 5% of linoleic acid, relative to the total weight of the composition on a dry-matter basis;

composition E' with no more than 7% of fat, at least 25% of TDF and at least 35% of protein, relative to the total weight of the composition on a dry-matter basis;

composition F' with no more than 12% of protein, at least 22% of fat, at least 0.25% of phosphorus, no more than 0.5% of calcium and at least 0.7% of EPA and/or DHA, relative to the total weight of the composition on a dry-matter basis;

composition G' with no more than 0.35% of Calcium, no more than 0.35% of phosphorus, at least 1.6% of Sodium and at least 25% of TDF, relative to the total weight of the composition on a dry-matter basis;

composition H' with no more than 6% of fat and at least 1.6% of sodium, relative to the total weight of the composition on a dry-matter basis;

composition I' with no more than 0.21% of Sodium and at least 1.65% of total arginine, relative to the total weight of the composition on a dry-matter basis;

composition J' with no more than 6 ppm of total copper and no more than 20% of fat, relative to the total weight of the composition on a dry-matter basis;

composition K' with at least 40% of protein and no more than 23% of starch, relative to the total weight of the composition on a dry-matter basis; and composition L' with at least 21% of total dietary fiber, relative to the total weight of the composition on a dry-matter basis, wherein none of the said pre-made pellet-like dry kibble compositions comprises a nutritionally complete composition.

\* \* \* \* \*